(12) United States Patent
Smith et al.

(10) Patent No.: US 7,356,540 B2
(45) Date of Patent: Apr. 8, 2008

(54) DATA STORAGE AND RETRIEVAL SYSTEM

(76) Inventors: David E. A. Smith, 4022 Kingridge Dr., San Mateo, CA (US) 94403; Anton R. Fleig, 143 Lorieli Way, Ben Lomand, CA (US) 95005

( * ) Notice: Subject to any disclaimer, the term of this patent is extended or adjusted under 35 U.S.C. 154(b) by 578 days.

(21) Appl. No.: 10/189,754

(22) Filed: Jul. 3, 2002

(65) Prior Publication Data

US 2004/0015503 A1 Jan. 22, 2004

(51) Int. Cl.
*G06F 17/30* (2006.01)
(52) U.S. Cl. .................. 707/101; 707/100; 707/102
(58) Field of Classification Search ......... 707/100–104
See application file for complete search history.

(56) References Cited

U.S. PATENT DOCUMENTS

| | | | | |
|---|---|---|---|---|
| 5,291,593 A | * | 3/1994 | Abraham et al. | 707/103 R |
| 5,561,803 A | * | 10/1996 | Kilis | 717/159 |
| 5,813,014 A | * | 9/1998 | Gustman | 707/103 R |
| 5,974,407 A | * | 10/1999 | Sacks | 707/2 |
| 6,442,566 B1 | * | 8/2002 | Atman et al. | 707/103 R |

* cited by examiner

*Primary Examiner*—Apu Mofiz
*Assistant Examiner*—CamLinh Nguyen
(74) *Attorney, Agent, or Firm*—H. Michael Brucker

(57) ABSTRACT

A user based computer system for information storage and retrieval in which information data items are stored in a persistent memory for later searching, retrieval and/or browsing and related in the memory by a frame system wherein the stored information includes primary information from outside the system and additional information derived from primary information and inherited from stored information.

37 Claims, 9 Drawing Sheets

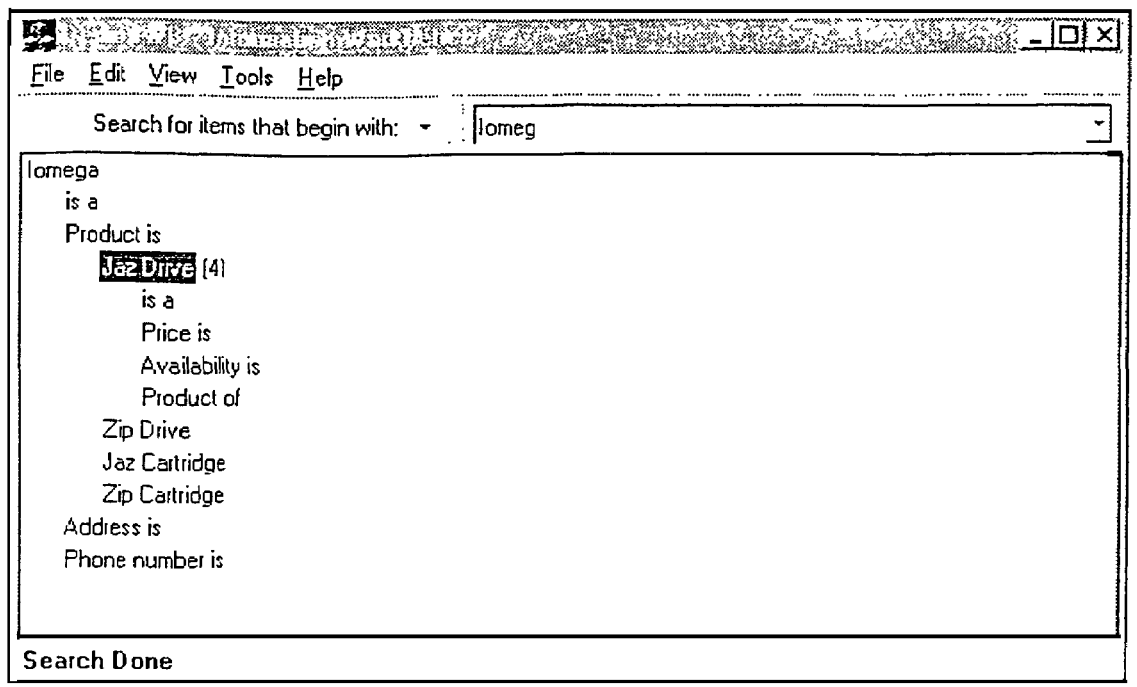
Figure 9. Information Workbench Client Window

DATA STORAGE AND RETRIEVAL SYSTEM

The present invention relates to user-based computer systems for storing and retrieving information and, in particular, to a computer system including software for causing a persistent memory to function as an information storage and retrieval system that receives primary information from outside the system, generates additional information from the primary information and stored information, and stores both the primary and additional information in a frame system in which the primary and additional information can be searched, retrieved and/or browsed.

BACKGROUND OF THE INVENTION

When personal computers first became available, many consumers thought that they would be able to put information into them and easily find and retrieve it later. Except in special cases, this promise remains unfulfilled. Computer programs today are universally designed to manage only specific types of information. Users who wish to store information in a computer and retrieve it must use computer programs specifically designed for particular information and are restricted to managing just that information. Examples of such programs often found on desktop personal computers are Intuit's Quicken (for personal financial information), Symantec's Act (for sales contact information), cooking recipe managers and "personal information managers" (PIMs) for to-do lists, telephone numbers, addresses, and so forth.

It is usually impossible to add new information elements related to the information for which the program is designed if the program has not been specifically designed to manage the additional elements. Because of this, competing programs with otherwise similar capabilities are often effectively distinguished only by the suitability for the user's task of the set of data elements that the programs manage. Using present-day database technology (and this includes the more recent object database technology), the data elements to be manipulated must be specified within the software programs that manipulate them. These specifications determine the size and format of the data being represented and the relationship between data elements. This descriptive process, despite the efforts represented by such products as Microsoft Access, is difficult for nonprogrammers. This means that most computer users are forced to try to find a program that can store and retrieve just the particular information in which they are interested.

Computer users often resign themselves to using a word processor to save collections of information in a "document." While this is suitable for small amounts of information, the lack of an ability to display the information as anything other than a text document limits the effectiveness of this solution for larger amounts of data.

Known databases are characterized by a structure designed to receive specific categories of information. In order to enter information in non-specified categories, the structure of the database must first be modified to permit entry and storage of information in that previously unidentified category. This is not always an easy task and frequently discourages the inclusion of such information. For example, if a database is structured to record names, addresses, telephone numbers and email addresses, it cannot record birthdays unless the structure of the database is modified to redefine the table to include that category of information to the structure. The addition of a new category of information that might be applicable to only a few of the entries in a large database is frequently avoided as not worth the bother.

BRIEF DESCRIPTION OF THE INVENTION

The computer system of the present invention addresses the aforementioned problems. The present invention combines ideas drawn from research in artificial intelligence and from object-oriented technology to produce uniquely flexible methods and apparatus for a computer program to store and retrieve information. The invention enables a user to store, browse and retrieve information on a wide variety of information topics for which the program was not specifically designed.

In the present invention, an improved computer information storage and retrieval system and method are provided using three primary elements: (1) a known data structure used in a novel way; (2) a program to create additional relationship information from primary relationship information; and (3) one of the several standard searching routines known in the art. The invention permits a user to enter any information desired at any time without the necessity of altering the data structure (redefining a table). Furthermore, the data entered is related according to relationships that are known to and of importance to the user. In this way, the database is personalized in a way that maximizes information retrieval from the database. For example, with the present invention, a database primarily intended to record names, addresses, telephone numbers and email addresses can, at any time and without any changes to the database structure, add birth dates, social security numbers, birth places, type of automobile owned, etc., to one or more of the entries. There are no impediments to adding any category of information to an entry, whether for one entry only, for several entries or for all entries.

At the same time, the database structure used in the present invention makes efficient use of the storage medium in which the data is persistently stored.

The present invention uses a frame system to store data. Frame systems were first introduced by Marvin Minsky in 1975 (Minsky, Marvin (1975) "A framework for representing knowledge," in P. Winston, ed., The Psychology of Computer Vision, McGraw-Hill, New York, pp. 211-280) in relation to work then being conducted in Artificial Intelligence (AI). Minsky defined frames in the following terms:

> A frame is a data structure for representing a stereotyped situation, like being in a certain kind of living room or going to a child's birthday party. Attached to each frame are several kinds of information. Some of this information is about how to use the frame. Some is about what one can expect to happen next. Some is about what to do if these expectations are not confirmed.
>
> We can think of a frame as a network of nodes and relations. The "top levels" of a frame are fixed, and represent things that are always true about the supposed situation. The lower levels have many terminals—"slots" that must be filled by specific instances of data. Each terminal—can specify conditions its assignments must meet. (The assignments themselves are usually smaller "sub-frames.") Simple conditions are specified by markers that might require a terminal assignment to be a person, an object of sufficient value, or a pointer to a sub-frame of a certain type. More complex conditions can specify relations among things assigned to several terminals.

Since Minsky published his work in 1975, others have expanded, modified and continued using frames to solve specific problems, to advance the quest for automated reasoning and translate one ontology into another.

The present invention uses the frame concept in a totally different way for a different purpose and with a different result. In the present invention, a frame system is used not to solve a problem, but rather to direct the storage of information in a database in an efficient manner and with multiple relationships created between data items. When primary information (data statement containing a plurality of data items) is entered into the database, the invention automatically generates one or more additional relationship statements between data items and then creates structural connections between the data items—both those already in the database and those being entered. Each data item entered is either related to previously entered data items of a category, or begins its own category, or both.

The database of the present invention can be searched using any one of the several search techniques well known in the art. For efficiency and speed, an AVL tree can be advantageously used, although, where appropriate, a simple string search might suffice. Searching a database of the present invention is independent of the frame structure used to organize and manage the data. Once the search locates data that fits the search query, the frame structure once again comes into play by being browsed to find the specific information sought. It is in the browse operation that the personalization of the data structure has its greatest benefit.

Accordingly, it is an object of the present invention to provide a computer system for storing and retrieving information having a structure that permits any category of information to be entered by the user without alteration of the database structure.

It is a further object of the present invention to provide a computer system for storing and retrieving information with the retrieval of information enhanced by generating additional data relationships from primary information.

It is still another object of the present invention to provide a method for storing and retrieving information in a computer memory that enables new categories of information to be added without restructuring the database.

These and other objects, aspects and features of the present invention will be better understood from the following detailed description of the preferred embodiments when read in conjunction with the appended drawing figures.

BRIEF DESCRIPTION OF THE DRAWINGS

FIG. 9 is an example of a client window.

DETAILED DESCRIPTION OF THE PREFERRED EMBODIMENTS

Figure 1A:
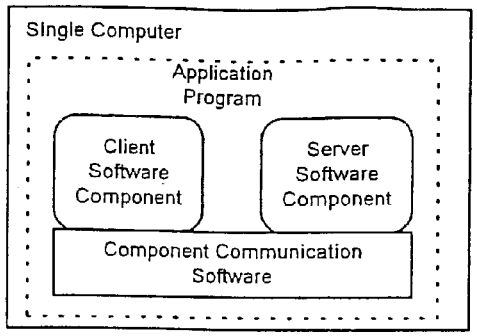
FIGS. 1A-1C are schematic illustrations of various configurations of the components of the invention.
Figure 1B:
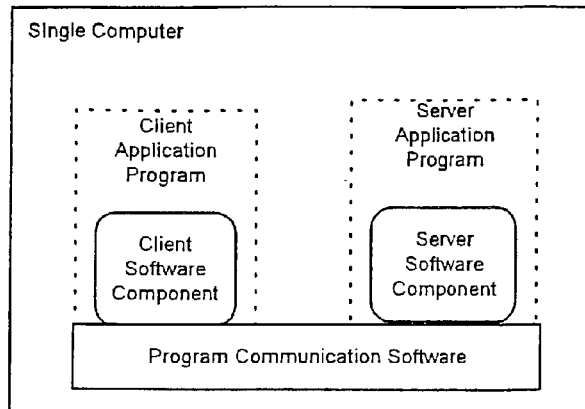
Figure 1C:
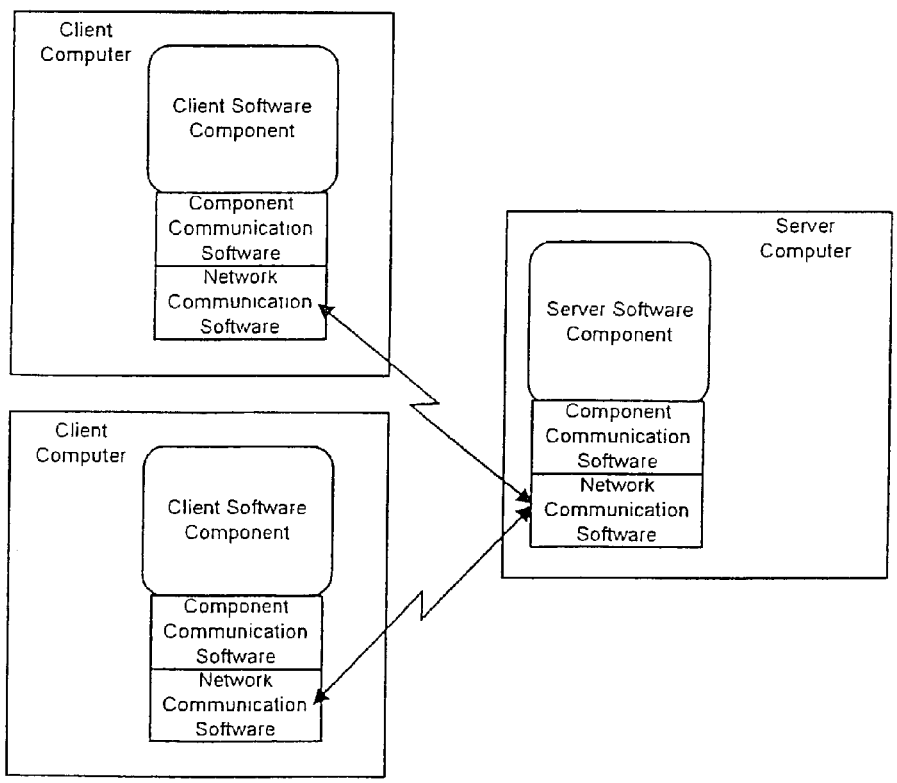

The computer program of the present invention has two principal software components: the data server software (server or server component) and the display client software (client or client component). These two components can be incorporated in the same computer program or can be in separate programs which can execute on the same computer or on different computers that communicate with each other. A server component can support more than one client. These alternative configurations are shown in FIGS. 1A-1C.

Client Component Overview

The client presents an interface to the user. This user interface accepts instructions to add, retrieve, modify, or delete information items that the server component manages.

Information is presented to the user on a computer display monitor. Other displays that might be used include the display on a mobile telephone, a tablet computer, or the display on a Personal Data Assistant (PDA) device, such as a Palm Pilot or Blackberry. In an alternative embodiment, information can be presented to the user audibly by using voice-synthesis software that takes input from the client component to control speakers connected to a sound card controller in the computer.

The user controls the client by using a keyboard or a "mouse" pointing device connected to the computer executing the client software. In an alternative implementation, user input could be received by the client component as messages from a speech recognition program that processes commands spoken by the user into a microphone connected to the sound card. The speech recognition program and the sound card could be in the computer executing the client software or could be in another computer that communicates electronically with the computer executing the client software.

In another embodiment, the user can control the client by using the telephone touch tones via a telephone connection to the client computer.

Server Component Overview

The server component stores user data received from the clients in a persistent storage system such as a data file system, manages the stored contents and retrieves stored information to send to client components. Many of the new capabilities of the data management system of the present invention are a consequence of the design of the server component software.

Basic Server Data Structures

The server component manages files containing six different types of data structures:
1. Data Item. This is a data object that completely represents an item of user data. A data item may, for example, be used to represent a last name, a phone number, a date, a paragraph of text, a picture, a sound recording, or even a piece of executable computer code.

Figure 2:
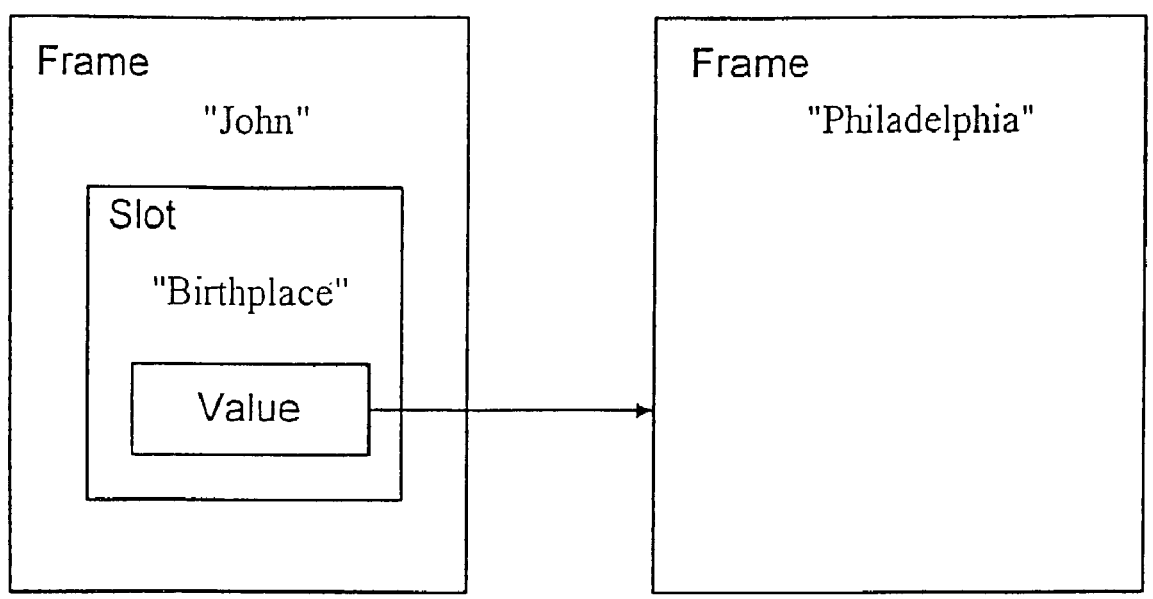
FIG. 2 is a schematic illustration of a typical relationship in a frame system between a frame, a slot and a value for the slot.

2. Symbol Block. This is a fixed-length data structure used to store data items in the computer files managed by the server. Data items that are too large to be stored in a single symbol block are stored in a collection of symbol blocks. In the preferred embodiment, a symbol block is never used to store data from more than one data item.
3. AVL Tree Node. This data structure is used to fink the data items in a data structure known as a "threaded AVL tree." The threaded AVL tree is used to rapidly search for data items.
4. Frame. One frame data structure exists for each data item stored by the server component. The terms frame and slot (used below) are taken from artificial intelligence (AI) research. Frame systems are logical reasoning programs that use the metaphor that objects are represented by frames and that binary relations between objects are represented by slots in one frame filled by another frame.
5. Slot Similar to the AI metaphor, slots are used to represent a binary relationship between two data items
6. Value. These data structures are used to connect slots that are contained in frames, to follow the AI metaphor, to other frame data structures. The relationship of the frame, slot, and value data structures can be seen in the following example. What is to be stored is the relationship John's birthplace is Philadelphia. This is a binary relation, birthplace, between John and Philadelphia. John is represented by a frame that has a slot for birthplace. In that slot is a value that connects the slot to another frame that represents Philadelphia. These structures are shown in FIG. 2.
7.

Data Item

The data item structure can be understood as a "class" in the programming language in an object-oriented programming language such as C++. The Information Workbench software components treat data items as C++ objects and manipulate them by calls to the data item member functions or "methods." The data item class software must also provide any data conversion routines that the application requires—such as a routine to produce a procedure name if the data item represents an executable procedure. An advantage of this approach is that the software of the present invention can be extended by merely altering the data item class software for new applications that manage new kinds of data items.

For a typical application, a C++ language definition for a data item class would be required to have the functionality of the member data variables and member functions shown below.

Data Members

```
typedef enum {
    IWD_Text,         // Text data
    IWD_Integer,      // Integer numeric data
    IWD_Real,         // Floating point numeric data
    IWD_Date,         // Date data
    IWD_Time,         // Time data
    IWD_FileID,           // File identifier
    IWD_InternetID,   // Internet identifier
    IWD JPEG,         // JPEG format picture image data
    IWD MP3,          // MPC format sound data
    IWD AVI,          // AVI format video clip
```

-continued

```
    IWD_None          // Unknown data type
} IWDataType;
IWDataType m_type;
```

This enumerated type indicates the type of application that the data represented by the data item class might be used for:

```
Typedef enum {
    IWF Integer,      // Integer numeric data
    IWF Real,         // Floating point numeric data
    IWF DateTime,     // System binary formatted Date and Time
    IWF String,       // ASCII text string
    IWF Unicode,      // Unicode text string
    IWF Binary,       // System formatted binary block
} IWDataFormat;
IWDataFormat m format;
```

This enumerated type indicates the internal binary representation of the data represented by the data item class.int-m_nsize;

This is the size, typically in bytes, of the memory buffer used to contain the representation of the stored data.

char*m_pData;

This is a pointer to the location in memory where the representation of the data item is stored.

Member Functions

IwDataItem( );

virtual ~IWDataItem( );

These are the C++ constructor and destructor functions for the data item class.

void SetType(const IwDataType type) m_type=type;};

inline IwDataType GetType( ) const {return m_type;};

There are member functions to store and to retrieve a value that indicates the type of data represented by the data item.

For each type of data that a data item can represent, there must be member functions to store and to retrieve that type of data in the data item. The following three functions are used to store and retrieve text character string data.

int GetBufferLength( ) const;

Returns the size of the buffer required to store the character string represented by the data item.

void GetData(char*p, int nBufSize) const;

Stores a character string representation of the data item in a buffer of size nBufSize at memory address p.

void SetData(char*p, int nBufSize);

Reads the character string representation of size nBufSize at memory address p and stores it in the data item structure.

There are member functions to remove the information contents of a data item and to determine if a data item contains no information.

bool IsEmpty( ) const;

Returns true if the data item structure contains no information, false otherwise.

void Clear( );

Removes the information content from a data item structure.

Data items will often be stored in sorted order to permit rapid searching. Therefore, there are member functions for comparing two data items to determine which follows the other in the chosen sorting order and to determine if the content of two items match each other according to some specified criteria to satisfy a data item search.

int Compare(const IWDataItem & b) const;

int Compare(const IWDataItem & a, const IWDataItem & b) const;

Returns 0 if the items match, −1 if data item represented by a precedes b in the sort order, +1 otherwise.

int Compare(const IWDataItem & a, const IWDataItem & b, int match_len) const;

Compares segments of length match_len of data items a and b, typically beginning at the start of the data representation in each, and returns 0 if the segments match, −1 if the segment of a precedes segment of b in the sort order, 1 otherwise.

In an alternative embodiment, the comparison of data items might also make use of stored information about the data types, such as their source, the time of their entry into the database, the dates during which the data was valid, or other information characterizing data. Such a comparison might indicate that two data items are equivalent only if they were valid on the same dates. In another alternative embodiment, a comparison might indicate that the two data items are equivalent if their texts are close enough to each other as measured by a technique such as counting the number of mismatched letters.

bool IsEmbeddedMatch(const IWDataItem & a, const IWDataItem & sub);

Returns true if the data represented by data item structure sub can be found somewhere within the data represented by data item a, false otherwise.

Finally, data items may contain elements for use in specific applications that identify their source, the time they were last modified, their update history, the identification of users with permission to modify them, and so forth.

Symbol Block

The symbol block structure is a fixed size structure used to store data item structures. If the data item to be stored is too large to fit in the memory allocated for data in a single symbol block, more than one symbol block is used. Each symbol block has an identifier, unique among symbol blocks, known as a "handle". The handle of a symbol block is used to locate the block in the persistent storage managed by the server component. Data item symbol blocks contain references to other symbol blocks (the handle values) so that symbol blocks can be organized in "linked lists." FIG. 3 shows the use of symbol blocks to store data item representations.

Figure 3:
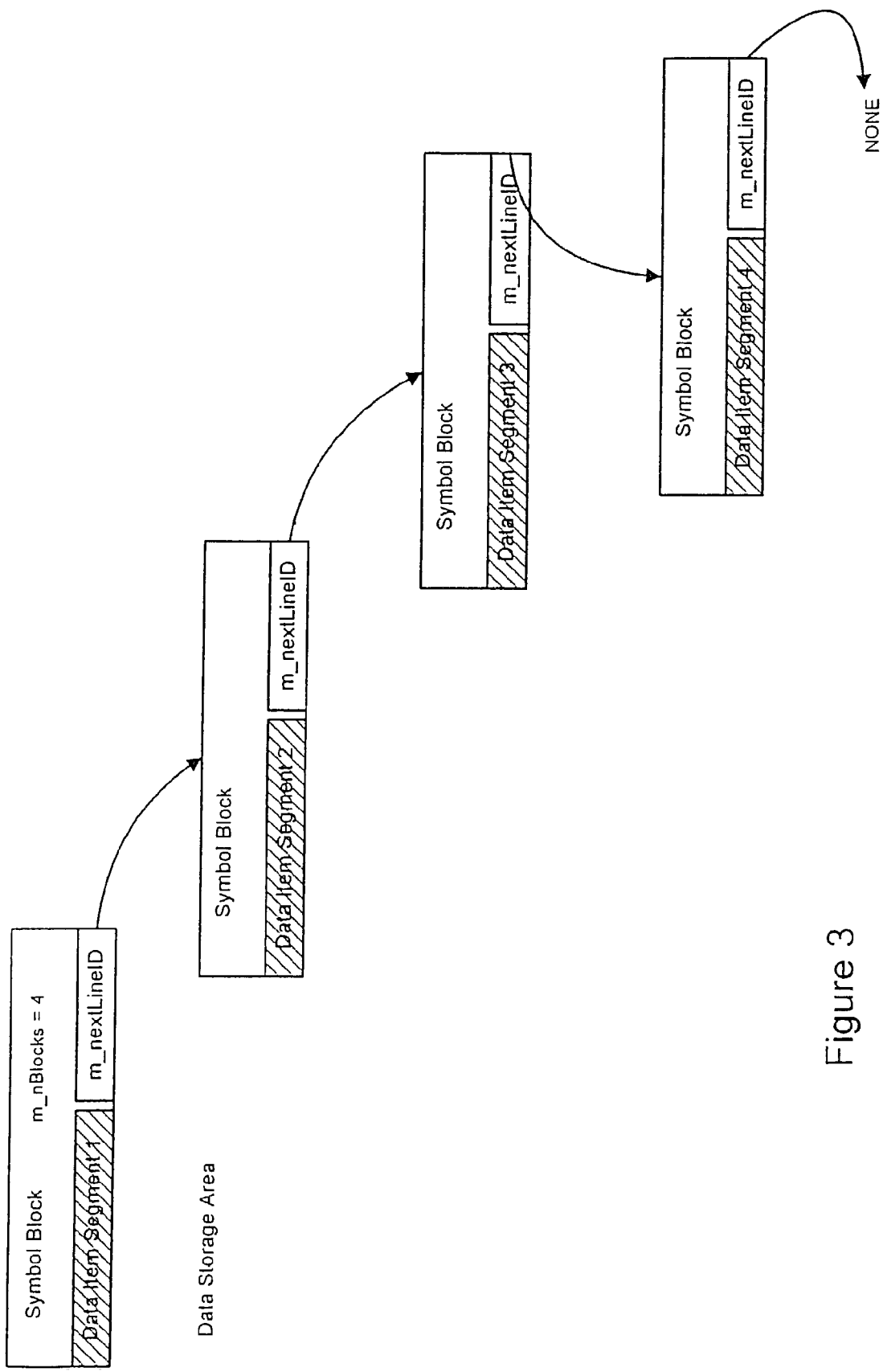
FIG. 3 is a schematic block diagram illustrating the use of symbol blocks to store data item representations.

Also shown in FIG. 3 is a block pointer set to NONE This is a special value that signifies that no block exists. The special value NONE, as will be seen, is used in a number of circumstances in the present invention software to signify that nothing is referenced by a link pointer.

A typical C++ definition for a class to represent a symbol is shown below:

```
class IWSymbol
{
public:
    IWSymbol(void * data = NULL, int dsize = 0);
    virtual ~IWSymbol( );
    inline void setAVLID(unsigned long id) {m_pBlock->m_AVLID = id;};
    inline unsigned long getAVLID( ) {return m_pBlock->m_AVLID;};
    inline void setID(unsigned long id) {m_pBlock->m_id = id;};
    inline unsigned long getID( ) { return m_pBlock->m_id;};
    inline void setNextLineID(unsigned long id) {m_pBlock->m_nextLineID = id;};
    inline unsigned long getNextLineID( ) (return m_pBlock->m_nextLineID;);
    inline void setFirstLineID(unsigned long id) {m_pBlock->m_firstLineID = id;};
    inline unsigned long getFirstLineID( ) {return m_pBlock->m_firstLineID;};
    void setData(void* pdata, int dsize);
    inline const char* getData( ){return m_pBlock->m_pData;);
    inline int getSize( ){return m_pBlock->m_size;);
    static int GetSymbolDataSize( );
    inline int GetBlockCount( ){return m_pBlock->m_nBlocks;};
    inline void SetBlockCount(int count){m_pBlock->m_nBlocks = count;};
    inline void * getSymbolBlockPointer( ) { return m_pBlock;};
    static int getSymbolBlockSize( );
protected:
    static void SetSymbolDataSize(int nsize);
private:
    struct tagSymbolBlock
    {
        unsigned long m_AVLID;
        unsigned long m_id;
        unsigned long m_nextLineID;
        unsigned long m_firstLineID;
        unsigned long m_size;
```

```
        int m__nBlocks;
        char m__pData[1];
    } * m_pBlock;
};
```

The constructor allocates memory for the s and puts its memory address in m_pBlock. The destructor deallocates the tagSymbolBlock memory.

inline void setAVLID(unsigned long id) {m_pBlock->m_AVLID=id;};

inline unsigned long getAVLID( ) {return m_pBlock->m_AVLID;};

The symbol blocks are also linked to another of the server component data structures, the AVL tree node, mentioned above and discussed in the next section. Each AVL tree node also has an identifier, unique among AVL tree nodes, also known as a "handle," which is used to locate the node data structure in the persistent storage managed by the server component. These member functions are used to store and retrieve the handle of the AVL tree node that this symbol block is associated with.

inline void setID(unsigned long id) {m_pBlock->m_id=id;};

inline unsigned long getID( ) {return m_pBlock->m_id;};

These member functions are used to store and retrieve the handle of the symbol block.

inline int GetBlockCount( ){return m—pBlock->m_nBlocks;};

inline void SetBlockCount(int count){m_pBlock->m_nBlocks=count;};

These member functions are used to store and retrieve the handle of the total number of symbol blocks in a set of symbol blocks that are being used to store a data item.

inline void setFirsttLineID(unsigned long id) {m_pBlock->m_firstLineID=id;};

inline unsigned long getFirstLineID( ) {return m_pBlock->m_firstLineID;};

These member functions are used to store and retrieve the handle of the first symbol block in a sequence of symbol blocks that are being used to store a data item.

inline void setNextLineID(unsigned long id) {m_pBlock->m_nextLineID=id;};

inline unsigned long getNextLineID( ) {return m_pBlock->m_nextLineID;};

These member functions are used to store and retrieve the handle of the next symbol block in a sequence of symbol blocks that are being used to store a data item.

static int GetSymbolDataSize( );

This member function returns the maximum size of the segment of a data item that can be stored in a symbol block. Data item representations that are larger than this must be divided and stored in more than segmented and stored in more than one symbol block.

void setData(void* pdata, int dsize);

This member function is used to copy a segment of a data item representation into a symbol block. The memory location of the segment being copied is given by pdata, and size of the segment to be copied is given by dsize, which cannot be greater than the size returned by GetSymbolDataSized( ).

inline const char* getData( ){return m_pBlock->m_pData;};

This member function is used to retrieve the memory address of the data item storage region in the symbol block.

inline int getsize( ){return m_pBlock->m_size;};

This member function is used to retrieve the size of the memory region actually used to store the data item currently stored in this symbol block. This will be the same value given as dsize when the function setData(void* pdata, int dsize) was called to store the data segment in the symbol block.

inline void*getSymbolBlockPointer( ) {return m_pBlock;};

This member function is used to retrieve the address of the memory region allocated for the symbol block.

AVL Tree Node

Figure 4:
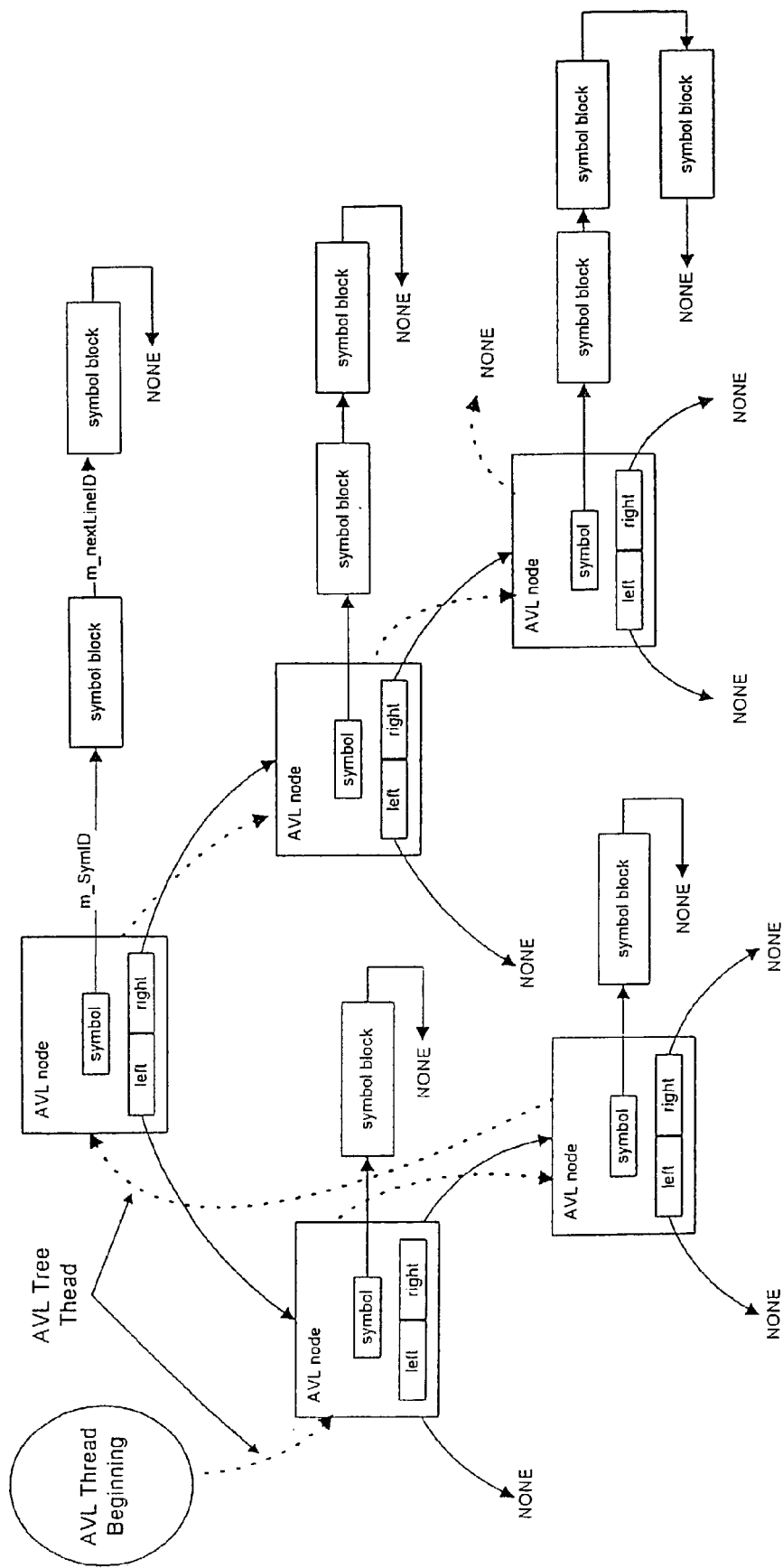
FIG. 4 is a schematic block diagram illustrating a small threaded AVL tree with links to the symbol blocks that store the data item associated with each tree node.

Each data item has associated with it an AVL tree node structure. Each AVL node structure contains references to other AVL node structures. The set of AVL node structures associated with data items is organized as a "threaded AVL tree." This is an AVL tree in which each node also contains links (the handle values) of the next AVL tree node and the previous node in the data item sort order that the tree implements. FIG. 4 shows a small threaded AVL tree with links to the symbol blocks that store the data item associated with each tree node.

Each AVL tree node that is associated with a data item is also associated with a frame data structure, mentioned above and discussed in the next section. Each frame structure also has an identifier, unique among frame structures, known as a "handle," which is used to locate the frame structure in the persistent storage managed by the server component. A C++ language definition of the AVL tree node structure is shown below:

```
enum cmp_t {
    MIN_CMP = -1,   // less than
    EQ_CMP  =  0,   // equal to
    MAX_CMP =  1    // greater than
};
```

-continued

```
// AvlNode -- Class to implement an AVL Tree for IWSymbols
//
class AvlNode
{
public:
    // ----- Constructors and destructors:
    AvlNode( ) : m__io(NULL),m__stored( ) { };
    AvlNode(const AvlNode &);
    AvlNode(IWDataItem &);
    ~AvlNode(void);
    // Max number of subtrees per node
    enum { MAX__SUBTREES = 2 };
    // Indices into a subtree array
    enum dir__t { LEFT = 0, RIGHT = 1 };
    // Query attributes:
    // Get this node's data item contents
    IWDataItem & getDataItem( );
    // Query the balance factor, it will be a value between −1 . . . 1
    // where:
    //   −1 => left subtree is taller than right subtree
    //    0 => left and right subtree are equal in height
    //    1 => right subtree is taller than left subtree
    short Bal(void) const { return m__stored.m__Bal; }
    // Get the item at the top of the left/right subtree of this
    // item (the result may be NULL if there is no such item).
    //
    unsigned long Subtree(dir__t dir) const { return
m__stored.m__SubTreeID[dir]; }
    inline int decrementSymbolReferenceCount( )
        {m__stored.m__referenceCount−−; return
    m__stored.m__referenceCount;};
    inline void
incrementSymbolReferenceCount( ){m__stored.m__referenceCount++;};
    inline unsigned long getID( ) (return m__stored.m__id;);
    inline void setID(const unsigned long id) {m__stored.m__id = id;};
    inline unsigned long getSymbolNameID( ) {return
m__stored.m__SymID;);
    inline void setSymbolNameID(const unsigned long id) {
m__stored.m__SymID = id;};
    inline unsigned long getFrameID( ) (return m__stored.m__frameID;);
    inline void setFrameID(const unsigned long id) {m__stored.m__frameID
= id;};
    inline int getSymbolReferenceCount( ) {return
m__stored.m__referenceCount;);
    inline void setSymbolReferenceCount(const int count)
        {m__stored.m__referenceCount = count;);
    inline unsigned long getNextNodeID( ) {return
m__stored.m__NextNodeID;};
    inline void setNextNodeID(unsigned long id)
{m__stored.m__NextNodeID = id;};
    inline unsigned long getLastNodeID( ) {return
m__stored.m__LastNodeID;};
    inline void setLastNodeID(unsigned long id) {m__stored.m__LastNodeID
= id;};
    // Perform a comparison of the given key string against the given
    // item using the given criteria (min, max, or equivalence
    // comparison). Returns:
    //   EQ__CMP if the keys are equivalent
    //   MIN__CMP if this key is less than the item's key
    //   MAX__CMP if this key is greater than item's key
    cmp__t Compare(const IWDataItem & data, cmp__t cmp=EQ__CMP, int
match__len = 0,
        bool wildcards = false);
    bool IsEmbeddedMatch(const IWDataItem & a, const IWDataItem &
sub);
private:
    // ----- Private data
    struct stored__node__t
    {
        unsigned long m__SubTreeID[MAX__SUBTREES];   // Subtree
```

```
handles
      unsigned long m__id;              // Avl node handle
      unsigned long m__SymID;           // Symbol block
handle
      unsigned long m__frameID;         // Frame handle
      unsigned long m__NextNodeID;      // Handle of
next AvlNode
      unsigned long m__LastNodeID;      // Previous
AvlNode handle
      int m__referenceCount;            // Reference count
      short m__Bal;                     // node balance factor
      struct stored__node_t( ) :        m__id(NONE),
          m__SymID(NONE),
          m__frameID(NONE),
          m__NextNodeID(NONE),
          m__Bal(0)
          {
          m__SubTreeID[LEFT] = m__SubTreeID[RIGHT] =
NONE;
          }
      } m__stored;
      // Reset all subtrees to null and clear the balance factor
      inline void Reset(void) {
          m__stored.m__Bal = 0 ;
          m__stored.m__SubTreeID[LEFT] = m__stored.m__SubTreeID[RIGHT]
= NONE;
      }
};
```

Member Functions

AvlNode( ): m_io(NULL),m_stored( ) { };
Constructs a new AvlNode instantiation that has no links to other structures.

AvlNode(const AvlNode & avl);
Constructs a new AvlNode instantiation that is a copy of the node avl.

AvlNode(IWDataItem & data);
Constructs a new AvLNode instantiation that has no links to other AvlNode structures, but that is linked to symbol blocks storing a representation of the data item data.

~AvlNode(void);
This is the destructor for an AvlNode.

short Bal(void) const {return m_stored.m_Bal;}
This member function returns node's balance factor, which is the difference in height between the left and right sub-trees.

unsigned long Subtree(dir_t dir) const {return m_stored.m_SubTreeID[dir];}
This member function returns handle of the node on the left or right sub-tree specified by the argument dir.

IWDataItem & getDataItem( );
This member function returns a reference to the data item structure, if any, associated with this tree node.

inline int getSymbolReferenceCount( ) {return m_stored.m_referenceCount;};

inline void setSymbolReferenceCount(const int count) {m_stored.m_referenceCount=count;};

inline int decrementSymbolReferenceCount( ) {m_stored.m_referenceCount--; return m_stored.m_referenceCount;};

inline void incrementSymbolReferenceCount( ){m_stored.m_referenceCount++;};

These member functions are used to store, to retrieve, to increment, and to decrement the value of m⁻referenceCount, the number of frame structures and slot structures that are associated with the data item that corresponds to this tree node.

inline unsigned long getID( ) {return m_stored.m_id;};

inline void setID(const unsigned long id) {m_stored.m_id=id;};

These member functions are used to store and retrieve the handle of this node.

inline unsigned long getSymbolNameID( ) {return m_stored.m_SymID;};

inline void setSymbolNameID(const unsigned long id) {m_stored.m_SymID=id;};

These member functions are used to store and retrieve the handle of the first symbol block in the set of linked symbol blocks used to store the representation of the data item associated with this node.

inline unsigned long getFrameID( ) {return m_stored.m_frameID;};

inline void setFrameID(const unsigned long id) {m_stored.m_frameID=id;};

These member functions are used to store and retrieve the handle of the frame data structure associated with this node.

inline unsigned long getNextNodeID( ) {return m_stored.m_NextNodeID;};

inline void setNextNodeID(unsigned long id) {m_stored.m_NextNodeID=id;};

These member functions are used to store and retrieve the handle of the node that follows this in the order in which the data items are sorted, inline unsigned long getLastNodeID( ) {return m_stored.m_LastNodeID;};

```
inline  void  setLastNodeID(unsigned  long  id)
{m_stored.m_LastNodeID=id;};
```

These member functions are used to store and retrieve the handle of the node that precedes this in the order in which the data items are sorted,

```
cmp_t  Compare(const  IWDataItem  &  data,  int match_len=0);
```

This member function is used to determine if the data item represented by data should precede, be at the same place, or follow in the sort order the data item associated with this node. The return value is an enumerated type that indicates which of the three possible outcomes the comparison found. The match_len, when non-zero, causes the comparison to use only a segment of the represented data in the comparison test. This usage corresponds to the usage of the match_len parameter in the data item member function Compare(cont IWDataItem & a, const IWDataItem & b, int match_len) described previously.

In some cases, the result of the Compare function can be computed correctly without having retrieved the all the symbol blocks for a data item. Consequently, in some implementations, speed may be improved if the comparison procedure is executed to determine if a non-matching result is already certain after retrieval of each symbol block of a multi-block data item.

```
bool  IsEmbeddedMatch(const  IWDataItem  &  a,  const IWDataItem & sub);
```

This member function is used to determine if the data item represented by is included in the data item associated with this node. This usage corresponds to the usage of data item member function IsEmbeddedMatch described previously.

Frame

Figure 5:
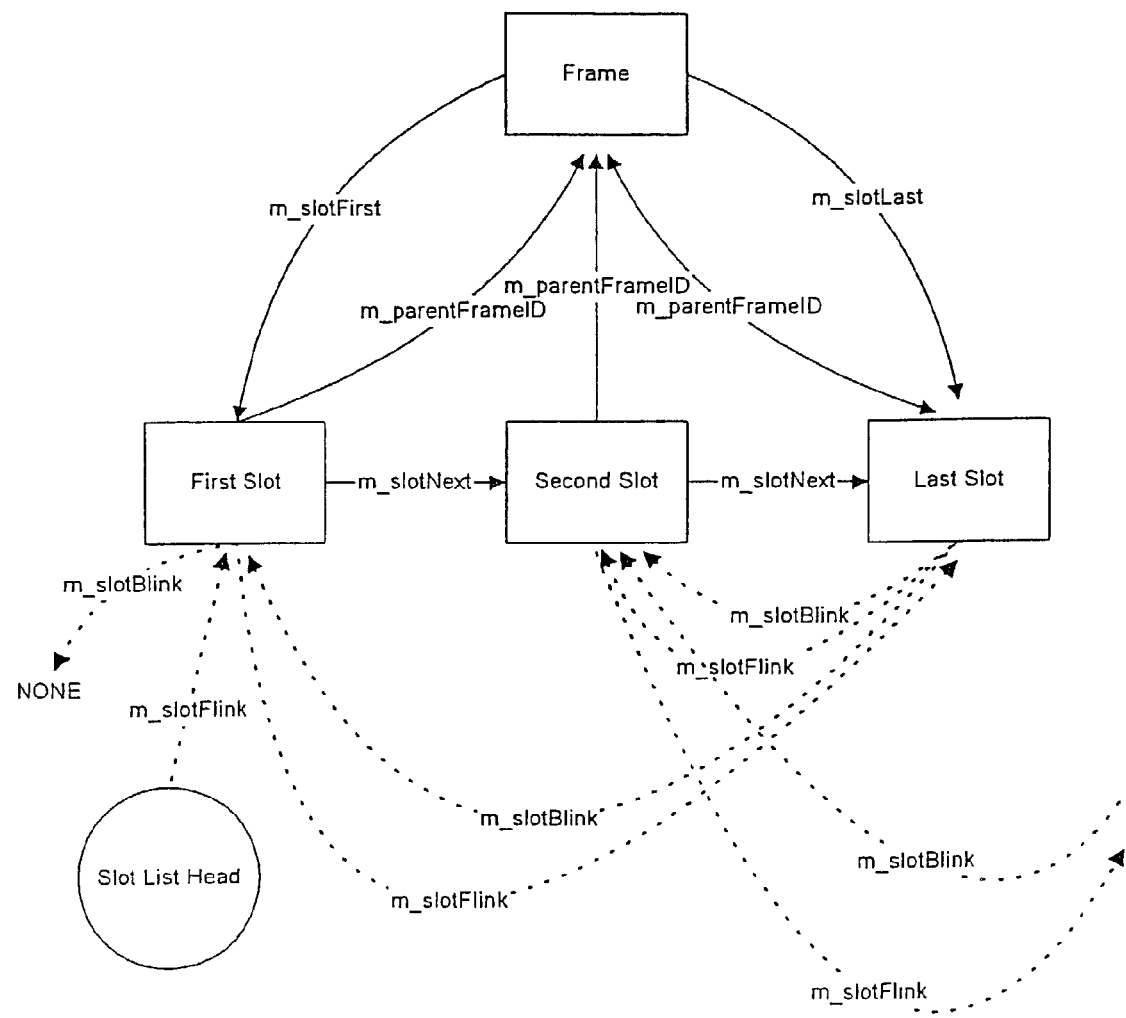
FIG. 5 is a schematic block diagram illustrating the relationship between a frame and its slot structures.

Each data item has associated with it a frame structure. As mentioned previously, each frame structure also has an identifier, unique among frame structures, known as a "handle," which is used to locate the frame structure in the persistent storage managed by the server component. Each frame structure also has one or more slot structures associated with it. Slot structures have been mentioned previously and will be described in more detail below. Slot structures also have handles that are unique among slot structures. The slot structures for a frame are joined in a linked list. Each frame structure has stored in it the number of its slots and the handle values of the first slot and last slot in its linked list of slots. This relationship between a frame and its slots is shown in FIG. 5. In addition, the ordering scheme for the slots in the linked list is a property of the frame. Each frame structure contains a value that specifies the ordering scheme for that frame's slots.

Although the slots are shown linked in a linked-list structure in FIG. 5, some applications may have very large numbers of slots and it may be desirable to link them in an alternative data structure, such as an AVL tree, to improve searching or sorting performance. In the case where the slots are linked in a tree structure, the frame structure would have a parameter that is the stored value of the handle of the route node of the frame's slot tree. The slot structures themselves would also have to be extended to include the necessary additional tree parameters.

The data members of a C++ definition for a frame class are shown below. IWDataOrder is an enumerated type whose elements correspond to sorting orders, the different ways that the application permits data items to be ordered-such as ascending alphabetical order, descending alphabetical order, numerical order, and so forth. The data item member function Compare is used to determine the relative order of two data items according to a particular sorting order.

Data Members

| | | |
|---|---|---|
| unsigned long | m_id; | // Handle of this Frame |
| unsigned long | m_SymbolTreeId; | // Handle of Symbol Tree node naming this frame |
| unsigned long | m_slotFirst; | // Handle of the first slot of this frame's slots |
| unsigned long | m_slotLast; | // Handle of the last slot of this frame's slots |
| unsigned int | m_slotCount; | // Number of this frame's slots |
| IWDataOrder | m_slotOrder; | // Order scheme for the slots |

Slot

Figure 6:
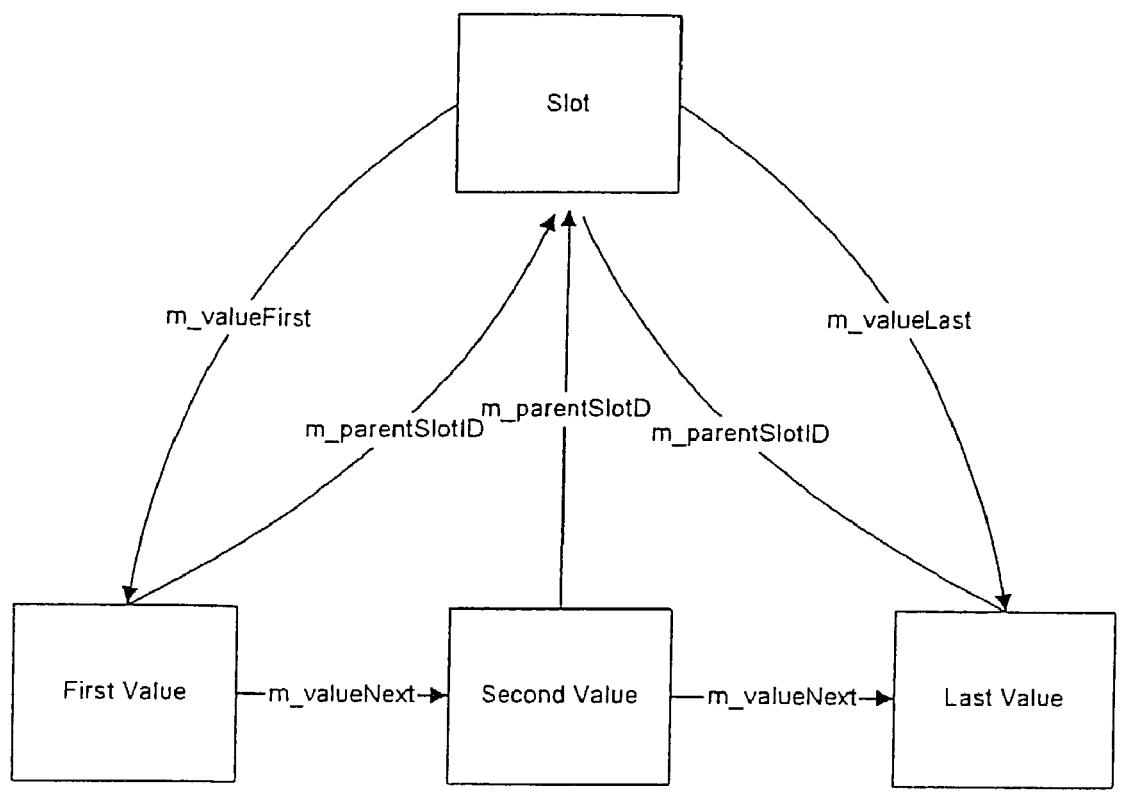
FIG. 6 is a schematic block diagram illustrating the relationship between a slot and its value structures.

Each slot structure may have one or more value structures associated with it. Value structures have been mentioned previously and will be described in more detail below. Value structures also have handles that are unique among value structures. The relationship between a slot and its value structures is shown in FIG. 6. The value structures for a slot are joined in a linked list. Each slot structure has stored in it the number of values it has and the handle values of the first value and last value in its linked list of value structures. Slots may also have no values, however. In this case, the value count is zero and the first and last value structure handles are set to NONE. The ordering scheme for the values in the linked list is a property of the slot and each slot structure has a parameter that specifies the ordering scheme for that slot's values.

Although the slot values are shown in FIG. 6 in a linked list, as mentioned for the slots in a frame, some applications may require the use of tree or other structures to efficiently manage large numbers of slot values. In these cases, the slot structure would be extended by the addition of a value tree root handle and the value structures would be extended by the addition of the necessary tree link parameters.

Slot structures are part of the mechanism used to characterize the relationship between data items. Slot structures may themselves also be associated with data items, depending on the slot's type. To see how slots are used to characterize relationships between data items, consider the example relationship mentioned previously: John's birthplace is Philadelphia.

For this case, the server creates three data item structures: John, birthplace, and Philadelphia. The relationship is represented by creating two frames, one linked to the data item for John and the other linked to the data item for Philadelphia, and giving the John frame a slot linked to the data item for birthplace. As the next section will describe, the slot will be given a value structure that links it to the frame for Philadelphia.

Slot Type

To use this same mechanism to characterize the relation Philadelphia is the birthplace of John, slots are given a "type" to specify the kind of relation they are being used to represent. The slot type employed for the relation John's birthplace is Philadelphia is called an "instance is" slot and the slot type used for the relation Philadelphia is the birthplace of John is called an "instance of" type slot. Both of these slot types always have associated data items, in this case, the data item for birthplace. John is a person is a relation that is represented using a slot type without an associated data item. The slot type used is called an "is a type of" slot. The slot types used by the server component to represent relationships are shown in Table 1.

TABLE 1

List of slot types.

| Slot Types | Data item associated | Example of relation the slot type is used to represent |
|---|---|---|
| Instance is | Yes | John's phone number is 555-1212 |
| Instances are | Yes | John's friends are Karen and Tom |
| Instance of | Yes | Tom is a friend of John's |
| Transitive | Yes | Allen knows Tom. |
| Commutative | Yes | Tom's spouse is Karen |
| Pair | Yes | Tom's wife is Karen Karen's husband is Tom |
| Type is | No | Phone number entries include 555-1212 |
| Is a type of | No | 555-1212 is a phone number |
| Is an attribute of | No | John has a phone number |

The first four slot types shown in Table 1 are used to represent a relation between a pair of data items that is named by a third data item associated with the slot. The instance is and instances are slot types have similar roles and are only different to signal client programs to present the relation to the user so that the number of the verb agrees with the number of the subject in an English language sentence. Additional slot types can be defined to improve data presentation in non-English applications. The instance of type is used to represent a relation between a pair of data items that can be derived from an instance is relation by exchanging the roles of the two items. Where John's phone number is 555-1212 is represented with an instance is slot associated with the data item phone number, 555-1212 is the phone number of John is represented using an instance of slot associated with the data item phone number. Commutative slot types are similar to instance is and instance of slot types, but are used when the binary relation being presented is necessarily true if the two data items are exchanged. As shown in the Table 1, if Tom's spouse is Karen, then Karen's spouse is Tom and this relationship can be represented by using a commutative type slot associated with a data item for spouse. Paired slot types are like commutative, except that the second relationship has a different name. For example, "wife" and "husband" are a pair of relationships that might be represented by paired type slots. The usefulness of paired type slots is that a look-up table can be used to derive the data item for the slot for the relationship that has the subject and the object reversed. The role of transitive slot type is again similar to the role of the pair slot type and differs only to signal client programs to present the relation to the user without using the verb "is" so that the data item of the slot appears as a transitive verb. Transitive slots, like pair type slots, generally use a different slot data item in the relation that exchanges the subject and the object (e.g.: knows and is known by). Again, the client or a look-up table can be used to find the data item for the slot for the reverse relationship.

The is a type of slot type is used to indicate that one data item represents something that is a member of a set represented by another data item, as in Denver is a city. The type is slot type is used to represent the opposite relationship, where a set represented by one data item includes something represented by another data item, as in cities include Denver. The is an attribute of slot type is used to represent the relation between a data item that names a binary relationship and the data item that corresponds to one of two objects participating in the relationship. For example, the is an attribute of slot type would be used to represent the relation age is an attribute of Tom.

Finally, all slots that the server component manages are joined in a single linked list. As mentioned previously, slots are associated with data attributes and it is often useful to be able to determine what attribute descriptions are in use. This linked list is used to locate all the slots managed by the server to retrieve the set of all attributes. In applications where it is useful to be able to quickly access all of the stored slot data structures, the slots can be organized in a tree or other structure, rather than a linked list, so the set of the attribute descriptions in use can be quickly retrieved.

Figure 7:
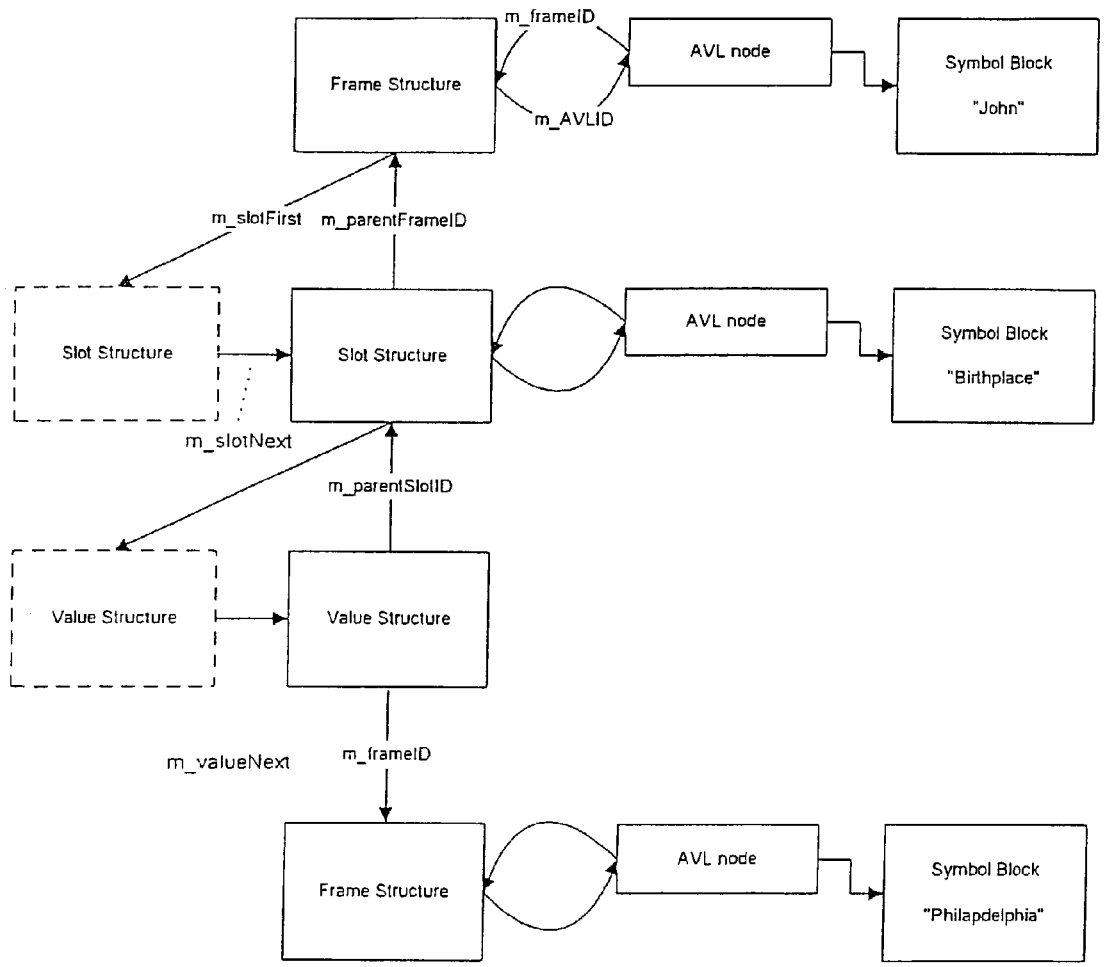
FIG. 7 is a schematic block diagram illustrating the relationship between a frame and its slots and an AVL tree.

The relationship between slots and their values is shown in FIG. 7.

The slot types represent forms of information recognizable by the system from which other forms (slot types) of the information can be derived.

The data members from a C++ definition for a slot class are shown below:

The IWDataOrder type is an enumerated type whose elements correspond to the different ways that the application permits data items to be ordered, such as ascending alphabetical order, descending alphabetical order, numerical order, and so forth. The data item member function Compare is used to determine the relative order of two data items according to a particular sort order. The IWSlotType is an enumerated type that has an element corresponding to each of different slot implemented in the server component.

Data Members

```
unsigned long   m_id;              // Slot's Handle
unsigned long   m_SymbolTreeID;    // Handle of symbol tree
                                      object for this slot
IWSlotType m_type;                 // Slot type
unsigned long   m_slotNext;        // Handle of next slot in the
                                      frame's slot list
unsigned long   m_valueFirst;      // Handle of the first value in
                                      the slot's value list
unsigned long   m_valueLast;       // Handle of the last value in
                                      the slot's value list
unsigned long   m_valueCount;      // Count of values
unsigned long   m_slotFlink;       // Handle of the next slot on
                                      the linked list
unsigned long   m_slotBlink;       // Handle of the previous slot
on the linked list unsigned long   m_parentFrameID;   // Handle of
                                      the slot's parent frame
IWDataOrder m_valueOrder;          // Storage order scheme for this
                                      slot's values
```

Value

Figure 8:
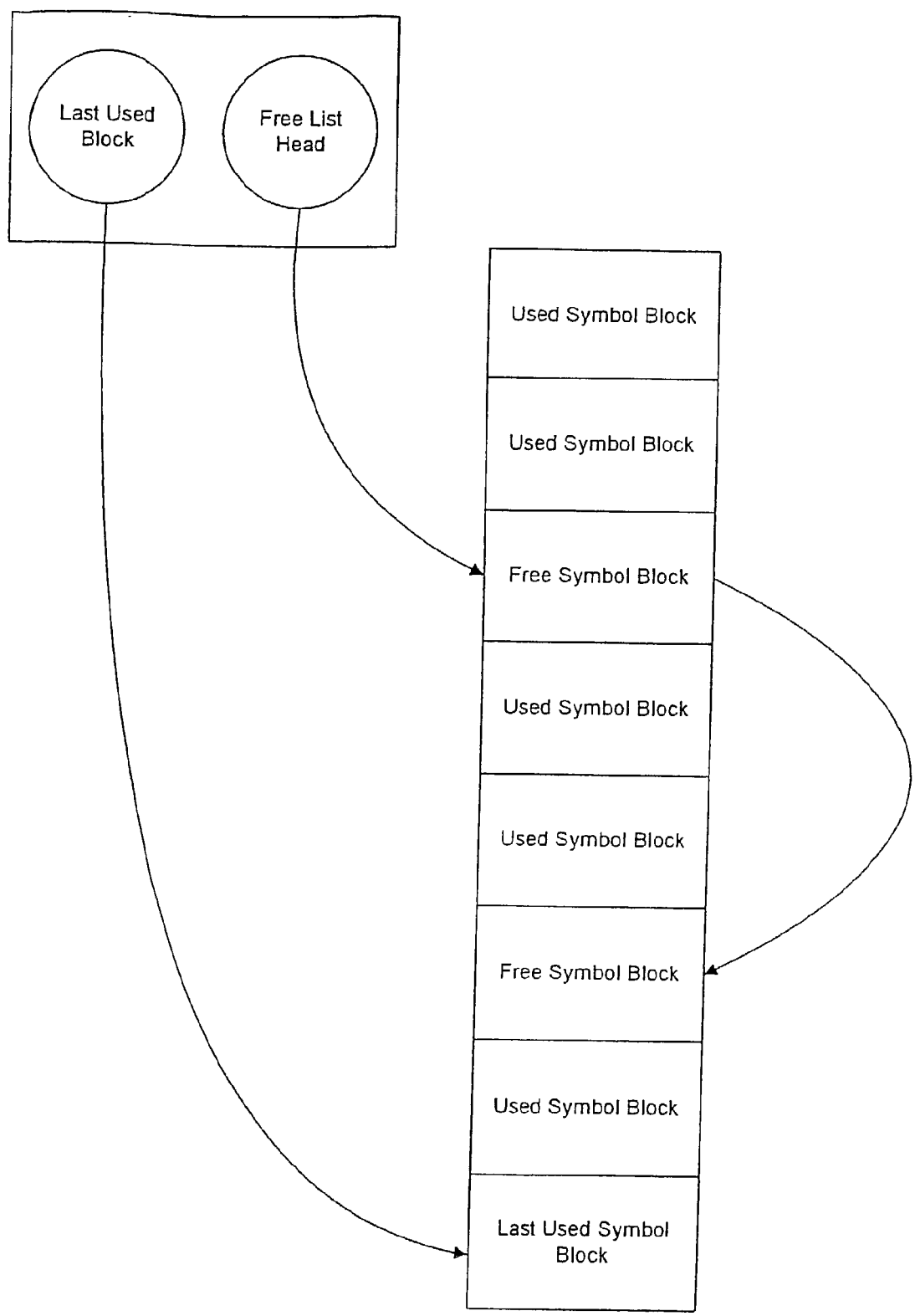
FIG. 8 is a schematic block diagram illustrating the logical organization of persistent storage for the fixed-size storage segments used to store the data structures.

Value structures are used to link slots to the frame associated with the second data item participating in the slot's binary relationship. This relationship is shown in FIG. 8. Each value structure contains the handle of a single frame structure. As mentioned previously, each value structure also has an identifier, unique among value structures, known as a "handle," which is used to locate the value structure in the persistent storage managed by the server component.

The data members from a C++ definition for a value class are described below:

Data Members unsigned long m_id;
    This member is the handle of the value structure.
unsigned long m_parentSlotID;
    This member is the handle of the value structure's parent slot.
unsigned long m_nextValueID;
    This member is the handle of next value structure in the parent slot's value list.
unsigned long m_frameID;
    This member is the handle of the frame associated with this value structure.

Storing Data

An important role of the server component is to manage the storage and retrieval of the data structures used to represent data items and data item relationships in a persistent medium. Typically the data structures are stored in the computer's file system on a disk drive. Alternative storage scenarios include storage in a battery-powered memory system, storage on magnetic tape, and storage on optical disks or CD-ROM. In some applications, the data may be supplied to the user in a read-only format, such as CD-ROM, and the server manages only the retrieval of data structures.

If the server component is implemented on a computer with a file system for persistent storage, the server component would typically employ the computer's file system software to read and write the data structures to persistent files.

Generally, the computer and associated file system cannot be guaranteed never to sustain a power, software, hardware, network or other failure that would cause transactions in progress to terminate abruptly. To prevent this from leaving the server database corrupted to an extent that the correct data structures cannot be retrieved, the server must employ techniques to guarantee the standard "ACID" database properties. The ACID acronym denotes the properties of
    Atomicity
    Consistency
    Isolation
    Durability File Interface In a typical application, the server component uses the computer's file system software to store and retrieve the five types of structures: symbol blocks, AVL nodes, frames, slots, and values. Each of these data structures has a fixed size so they can be efficiently stored in five different files, or in five different sections of a compound file in fixed-size segments. Each of the data structures has an identifying handle, which can be the index number of its segment in the storage file. If it is convenient, several different structure types can also be combined in a single file or single section of a compound file if the storage segment size is set large enough to hold the largest of the structures sharing the file.

In many applications using the server, the same data structures will often be stored and retrieved several times in a short time interval. To improve the server's performance in this situation, "caching" software is employed, which maintains a copy in memory of data structures that have been recently stored in or retrieved from the persistent storage system. The cache system stores data structures in memory blocks indexed by the structures' identification handles.

Inserting Data

To understand the data storage functions of the server component, it is useful to begin with the method for simply storing three data items that represent a binary relation, such as John's age is 30. The data insertion procedure for the relation will result in storage of a set of data structures linked in the relationship shown in FIG. 7. A client component or some other program will send the server three data structures called "insertion structures" containing the information necessary to construct the three data items for John, age, and 30 and the frame structures, slot structure, and value structure that represent the relationship between the data items.

An insertion structure must contain the information of a data item structure and additional information specifying what role the data item it represents plays in the relation representation being constructed. The additional information must include the type of slot to construct if the insertion structure describes a slot. The additional information for slot and value insertions may also include the position the new slot or value will take in the slot linked-list of a frame or the value linked-list of a slot structure.

In the preferred embodiment, insertion structures are implemented as a C++ language class derived from the data item class. Thus the insertion item class has all the information of the data item class and the additional information given by the insertion item class data members shown in Table 2.

TABLE 2

Insertion item class data members.

| Member Name | Type | Description |
| --- | --- | --- |
| m_slotType; | IWSlotType | Slot type indicator. This must have a value that signifies one of the slot types, such as instance is, implemented in the server component |
| m_siblingID; | unsigned long | Handle of sibling item to insert next to |
| m_parentID; | unsigned long | Handle of parent item |
| m_bBefore; | bool | True if item precedes sibling |
| m_srcItemID; | unsigned long | Temporary item handle supplied by source |

In the preferred embodiment of the server component, the insertion items are delivered as arguments to a subroutine. Which insertion item refers to the frame, slot or value to be created is understood from subroutine's argument order.

The very first step to inserting data is to notify the cache system that an atomic transaction is beginning.

Then, starting with the insertion item for what will become the frame for John in the relation John's age is 30, the first step is to determine if the data item is already stored in the symbol blocks of the database. This is accomplished by using an AVL tree search algorithm to search the symbol blocks pointed to by the AVL tree node structures stored in persistent storage.

Step 1. Retrieve the AVL Tree Root Node.

The AVL tree search begins by reading the handle of the root node of the database's AVL tree from a designated fixed location in the database's persistent storage. The root AVL node structure is then retrieved from persistent storage. The symbol block designated by the symbol block handle, m_SymID mentioned previously, from the retrieved node is then retrieved.

Step 2. Retrieve the Data Item from the Symbol Blocks Designated by the Current AVL Tree Node.

If the data item corresponding to the retrieved AVL node occupies more than a single symbol block, the symbol block's m_nBlocks data member will be greater than 1 and the m_nextLineID data member will be an actual handle rather than the special designated value NONE. The program continues to retrieve stored symbol blocks designated by the previously retrieved symbol block's m_nextLineID data member until the number of symbol blocks retrieved is the number in the m_nBlocks data member of the first block. The data stored in storage regions of the symbol blocks is concatenated in memory to construct the data item structure stored in the set of symbol blocks.

Step 3. Compare the Retrieved Data Item with the Data Item Being Searched for.

The data item Compare member function is used to compare the retrieved data item with the data item being searched for.

If the two match, the data item has been located in persistent storage and the search is finished. The AVL tree node for the data item that has been located contains the handle of the frame for the data item. Because the frame already exists, a new frame will not be created. The next step in data insertion for this example is constructing the slot information for the slot associated with the data item for age.

Step 4. If No Match, Retrieve a Sub-Tree Node that Becomes the Current Node.

If the data items do not match, the AVL tree node from the left or right branch of the current node is retrieved. The choice of left or right sub-tree is determined by the result of the comparison. The data item being searched for either precedes or follows the retrieved data item in the AVL tree's sorting order. The return value of the Compare function indicates which is the case. The left or right sub-tree node is selected, depending on whether the tree is ordered left-to-right or right-to-left. The sub-tree node handles are in the AVL node data structure. The appropriate node is retrieved and becomes the current node. The steps above are repeated, starting from Step 2, until the data item is found or until there is no sub-tree node to be retrieved after a comparison. This is indicated by the presence of special value NONE as the sub-tree node handle.

Frame Creation

If the data item has not been located in the persistent storage, a frame for it does not exist and a new frame must be created. This process begins with the construction of an AVL tree node for the data item and storage of the data item in symbol blocks.

Persistent Storage Structure

The logical organization of persistent storage for the fixed-size storage segments used to store the data structures managed by the invention is shown schematically in FIG. 8.

A special segment in persistent storage is used to store two numbers:

1. The handle, or index number, of the last persistent storage segment in use.
2. The handle of an unused segment that exists in the persistent storage before the last used segment, if one exists. Free segments before the last used segment are members of a linked list. Each segment contains the handle of the next segment on the list. The last segment on the list has the special value NONE for the handle of the next segment. If there are no free segments before the last used segment, the free-segment handle stored in the special segment is set to the value NONE.

When segments are freed, they are usually added to the free-segment linked list and the total number of persistent storage segments used for storage is not reduced.

When a storage segment is needed, the first free segment, if any, on the free-segment list is used. The free segment handle in the special segment is then set to point to the next free segment on the free-segment linked list. The handle of this segment is retrieved from the newly assigned segment. If there are no free segments on the free-segment list, the next segment after the last-used segment is used. The last-used segment handle in the special segment is then increased by 1.

Frame and AVL Tree Node Handles

The first step in frame creation is to get a handle for the new frame and the AVL Tree node associated with it. This is done by having the cache system take a frame handle from the frame persistent storage free list or, if that is empty, increase the persistent storage size and take the handle of an added storage segment. A new tree node handle is taken from the AVL node persistent storage free list or, if that is empty, the persistent storage size is similarly extended and the handle of an added storage segment is used Data Item Storage To store a new data item in symbol blocks, the first step is to determine the amount of memory occupied by the data item structure. This size is compared to the size of the data storage region in a symbol block structure to determine m_nBlocks, the number of symbol blocks needed to store the data item. Handles for free symbol blocks are removed by the caching system from the symbol persistent storage free list or, if that is empty, the persistent storage size is extended and the handles of the added segments are used for the required new symbol blocks.

The set of symbol structures to be used to store the data item is constructed in memory. The m_id handle values of the symbol block structures are set to the handle values acquired from persistent storage. The data item structure is divided into segments that fit into a symbol block. One symbol block is chosen as the first block. The data item segments are copied into the symbol block storage regions, starting with the first block. Each time a data segment is copied into a symbol block, the m_size value for the symbol block is set to the size of the segment copied into the block. The m_AVLID value of the first block is set to the new AVL node handle that has been acquired. The m_firstLineID values of all the blocks are set to the handle of the first symbol block. Another block is selected as the second block. The m_nextLineID value of the first block is set to the handle of the second block and the second data item segment is copied into the data region of the second block. This process is repeated until all the data segments have been copied into symbol block structures. The segments are copied into the symbol block structures in memory. The m_nextLineID value for the last symbol block is set to NONE. Each of the symbol block structures in memory is now sent to the cache software to be transacted to the to the persistent storage segment identified by the blocks m_id handle.

AVL Tree Node Storage

To store an AVL tree node, the node structure is first constructed in memory. The node's handle m_id is set to the new AVL node handle that has been acquired. The node's frame handle m_frameID is set to the newly acquired frame handle and the node's symbol block handle m_SymID is set to the handle of the first symbol block used to store the data item. The node's reference count m_referenceCount is set to 1 for the frame being created.

Five parameters are determined by the node's position in the AVL tree that is stored in persistent storage. These are the left and right sub-tree handles, the next node and previous node handles for the thread that runs through the tree, and the balance factor for the node, which is the difference in height between the left and right sub-trees. These five parameters are determined by the AVL tree node insertion procedure. The well-known procedure is to search the tree for the data item being inserted and then to proceed up the tree along the search path just traveled, adjusting the node balance factors and the tree handle and thread handle values. In this procedure, the tree is searched by retrieving AVL nodes and their data items from persistent storage. The data item Compare function is used to determine if the retrieved items precede or follow the new data item in the tree sorting order.

When the insertion procedure has determined the five tree parameters for the new node, their values are set in the memory copy of the node and the node is copied to the cache system for transaction to the segment that corresponds to its handle in persistent storage. Other nodes that have been retrieved and adjusted according to the insertion procedure are also sent to the cache system for transaction back to persistent storage

Frame Item Storage

The frame item structure is first constructed in memory. The frame's handle value m_id is set to the newly acquired handle. The frame's AVL tree node handle m_SymbolTreeId is set to the handle of the new AVL node. Initially, the frame has no slots, so its slot count m_slotCount is set to 0 and first and last slot handles, m_slotFirst and m_slotLast, are set to the special value NONE. If the insertion instructions for this frame include a slot order, then the slot order parameter m_slotOrder is set appropriately. When the frame structure's values have been set, the structure is copied to the cache system for transaction to the persistent storage segment designated by its m_id handle.

Slot Item Storage

The first step in slot construction is to acquire a new persistent storage handle for a slot structure. If the slot is type being constructed has an associated data item, then if the data item and its AVL node are not already in persistent storage, they must be created and inserted in persistent storage. The procedure for this is the same as the procedure described above for a frame's data item and AVL node, except that the AVL node's m_frameID parameter is set to NONE.

If the data item has been previously put into persistent storage, then searching the stored AVL tree will locate it. The AVL node for the data item is then retrieved from persistent storage and its m_referenceCount value is increased by 1. The AVL node structure is then copied back to its segment in persistent storage.

The slot item structure is first constructed in memory. The slot's handle value m_id is set to the newly acquired slot persistent storage handle. The slot's type parameter m_type is set to the slot type taken from the slot insertion structure. If the slot is associated with a data item, the slot's AVL tree node handle m_SymbolTreeID is set to the handle of the data item's AVL node. The slot's parent frame handle value m_parentFrameID is set to the handle of the slot's parent frame.

To insert the slot in the parent frame, the parent frame structure is retrieved from persistent storage. If the frame has no slots, then its m_slotFirst and m_slotLast values are set to the handle of the slot being created. If the frame has slots and the insertion item parameter m_siblingID for the slot being created is not NONE, then the new slot is to be placed in a particular position in the frame's slot list. This is accomplished by retrieving the frame's slot structures from persistent storage, beginning with the slot with handle given by the frame's m_slotFirst parameter. The next slot in the list is the slot with handle given by the just-retrieved slot's m_slotNext parameter. Slots are retrieved until the slot having the handle specified by the insertion structure's m_siblingID parameter is retrieved. If the insertion item parameter m_bBefore is true, the slot being created precedes the slot with handle m_siblingID, otherwise, it follows it. If the created slot precedes, its m_slotNext parameter is set to the value of m_siblingID and if there was a previously retrieved slot, its m_slotNext parameter is set to the handle of the slot being created. If there was no previously retrieved slot, the new slot is the frame's first slot and the frame's m_slotFirst parameter is set to the handle of the new slot.

If the insertion item parameter m_bBefore is false, the slot being created follows the slot with handle m_siblingID. The m_slotNext parameter of the m_siblingID slot is set to the handle of the newly created slot. If the created slot is last, its m_slotNext parameter is set to NONE and the frame's m_slotLast parameter is set to the handle of the newly created slot.

If the insertion structure's m_siblingID parameter is NONE, then the new slot is inserted in the frame's linked list of slots according to the frame's default sort order, which is designated by the frame's m_slotOrder parameter. In this case the insertion procedure is to retrieve the frame's slots from persistent storage, retrieve the associated data items, if any, and use the data item Compare member function to determine the correct position for the new slot in the frame's link list of slots.

To conclude the insertion of a slot into a frame, the frame's slot count m_slotCount is increased by 1 and then the frame and any slot structures that have been retrieved and modified are copied to the cache system for eventual transaction back to their respective segments in persistent storage.

Initially, the new slot has no values, so its value count m_valueCount is set to 0 and first and last value handles, m_valueFirst and m_valueLast, are set to the special value NONE. If the insertion instructions for this slot include a value order, then the value order parameter m_valueOrder is set appropriately. The final step in slot creation is to set the links to insert the slot in the database's linked list of all slots.

This is done by first retrieving from the cache system the first slot handle from slot list-head segment in persistent storage. If no slots exist in persistent storage, this parameter will be NONE. If the parameter is not NONE, it is a slot handle and the slot it designates is retrieved from persistent storage. The m_slotBlink parameter of the newly created slot is set to NONE and the m_slotFlink parameter of the new slot is set to the value that was stored in the slot list-head. The slot list-head segment of persistent storage is set by the cache system to the handle of the newly created slot. The slot structure that was designated by the slot list-head has its m_slotBlink parameter set to the handle of the newly created slot and is then copied to the cache system for transaction into its segment in persistent storage.

When creation of the new slot structure in memory is finished, the structure is copied to the cache system for transaction into the persistent storage segment designated by its m_id handle.

Value Item Storage

The first step in value construction is to acquire a new persistent storage handle for a value structure. Each value structure is associated with a frame. The frame is a frame for the value's data item. If a frame for the value's data item already exists, it is located by searching the AVL tree and taking the m_frameID value from the data item's AVL node as the frame's handle.

If the data item has not been previously put into persistent storage, then it is sent to the cache system storage, a new AVL node is created and sent to the cache and a frame is created as described above in the section on frame item storage.

The value item structure is first constructed in memory. The value structure's handle m_id is set to the newly acquired persistent storage handle. The value's parent slot handle value m_parentSlotID is set to the handle of the value's parent slot.

The procedure to insert a value in a parent slot is similar to the procedure used to insert a slot in a parent frame. The parent slot structure is first retrieved. If the slot has no values, then its m_valueFirst and m_valueLast parameters are set to the handle of the value being created. If the slot has values and the insertion item parameter m⁻siblingID for the value being created is not NONE, then the new value is placed in particular position in the slot's value list. This is accomplished by retrieving the slot's value structures from persistent storage, beginning with the value with handle given by the slot's m_valueFirst parameter. The next value in the list is the value with handle given by the just-retrieved value's m_valueNext parameter. Values are retrieved until the value structure having the handle specified by the insertion structure's m_siblingID parameter is retrieved. If the insertion item parameter m_bBefore is true, the value being created precedes the value with handle m_siblingID, otherwise, it follows it. If the created value precedes, its m_valueNext parameter is set to m_siblingID and if there was a previously retrieved value, its m_valueNext parameter is set to the handle of the value being created. If there was no previously retrieved value, the new value is the slot's first value and the slot's m_valueFirst parameter is set to the handle of the new value.

If the insertion item parameter m_bBefore is false, the value being created follows the value with handle m_siblingID. The m_valueNext parameter of the m_siblingID value is set to the handle of the newly created value. If the created value is last, its m_valueNext parameter is set to NONE and the slot's m_valueLast parameter is set to the handle of the newly created value.

If the insertion structure's m_siblingID parameter is NONE, then the new value is inserted in the slot's linked list of values according to the slot's default sort order, which is designated by the slot's m_valueOrder parameter. In this case, the insertion procedure is to retrieve the slot's values from persistent storage, retrieve the associated frame, and then the data item designated by the frame. The data item Compare member function is then used to determine the correct position for the new value in the slot's linked list of values.

To conclude the insertion of a value into a slot, the slot's value count m_valueCount is increased by 1 and then the slot and any value structures that have been retrieved and modified are copied to the cache. The creation of the new value structure in memory is now finished and the structure is copied to the cache segment designated by its m_id handle.

This completes the construction of the set of frame, slot, AVL node, and symbol block structures to store the example relation John's age is 30. If no additional data were to be stored to service this client request, cache software system would be instructed to commit the created and altered structures to persistent storage. As will be described below the server must typically store several relations to service a data insertion request, however. When this is the case all the storage modifications necessary to service the request are typically committed at once rather than relation by relation.

Insertion into Known Slots and Frames

The foregoing section has described the creation of a new frame, slot, and value combination. When a new slot is to be added to a known frame, the frame handle is provided to the server by the client component. Similarly, when a new value is to be added to a known slot, the slot's handle is provided for the server in the insertion item structure by the client component.

Inserting Implications

When a new representation of a relation is stored, the server component also stores representations of what are called "implied" relations. Implied relations are deduced from the original relation that is being inserted.

For example, if the originally inserted relation is John's Birthplace is Philadelphia, then the following are implied relations:
Philadelphia is the birthplace of John
Birthplace is an attribute of John
Philadelphia is a Birthplace
Birthplace entries include Philadelphia Representations of these relations are stored by the server in response to the instruction to add the relation John's Birthplace is Philadelphia The server uses the slot insertion item's slot type to determine what implied relations will be created and stored. Table 3 shows the frame, slot, and value structure combinations that the server recognizes, generates and stores for the primary relation and its implications for different slot types. The numbers 1, 2, and 3 in the table indicate which data item is associated with the frame, slot, or value structure created for the relation when the server is given insertion items describing a frame data item (1), a slot data item (2) and slot type, and a value data item (3). The first combination for each slot type is the representation of the primary information (relation) from the insertion item set delivered to the server. The combinations that follow are the implications that are also created and stored.

Some entries indicate the use of a fourth data item (4). The fourth data item is used for the slot when the primary relation is represented by a Transitive or Pair type slot. An example is the primary relation Jane's husband is Bill, which can be presented with a pair type slot having the implication Bill's wife is Jane. Depending on the application, the auxiliary data item for wife can be delivered to the server by the client component or the server can use a previously loaded lookup-table of data item pairs to generate the fourth data item for the wife slot. The situation is similar for Transitive slots, such as would be used for Jack knows biology. The reverse relation, Biology is known by Jack requires a data item for is known by, which can received from the client component or generated by the server from a predefined lookup table.

The last row in the table indicates that the implication of a relation such as Age is an attribute of Tom is the relation Tom's age is unknown. The server component represents the age is unknown relation by a slot, for age, that has no value items attached to it.

TABLE 3

Server actions to store implied relations.

| Insertion Slot Type | Frame Data Item | Slot Type | Slot Data Item | Value Data Item |
|---|---|---|---|---|
| Instance is Instances are | 1 | Instance is Instances are | 2 | 3 |
| | 3 | Instance of | 2 | 1 |
| | 2 | Type is | None | 3 |
| | 3 | Is a type of | None | 2 |
| | 2 | Is an attribute of | None | 1 |
| Instance of | 1 | Instance of | 2 | 3 |
| | 3 | Instance is | 2 | 1 |
| | 2 | Type is | None | 1 |
| | 1 | Is a type of | None | 2 |
| | 2 | Is an attribute of | None | 3 |
| Commutative | 1 | Commutative | 2 | 3 |
| | 3 | Commutative | 2 | 1 |
| | 2 | Type is | None | 3 |
| | 3 | Is a type of | None | 2 |
| | 2 | Is an attribute of | None | 1 |
| | 2 | Is an attribute of | None | 3 |
| Pair | 1 | Pair | 2 | 3 |
| | 3 | Pair | 4 | 1 |
| | 2 | Type is | None | 3 |
| | 4 | Type is | None | 1 |
| | 4 | Is an attribute of | None | 3 |
| | 3 | Is a type of | None | 2 |
| | 2 | Is an attribute of | None | 1 |
| Transitive | 1 | Pair | 2 | 3 |
| | 3 | Pair | 4 | 1 |
| | 2 | Type is | None | 3 |
| | 4 | Type is | None | 1 |
| | 4 | Is an attribute of | None | 3 |
| | 3 | Is a type of | None | 2 |
| | 2 | Is an attribute of | None | 1 |
| Type is | 1 | Type is | None | 3 |
| | 3 | Is a type of | None | 1 |
| Is a type of | 1 | Is a type of | None | 3 |
| | 3 | Type is | None | 1 |
| Is an attribute of | 1 | Is an attribute of | None | 3 |
| | 3 | Instance is | 1 | None |

Inserting Inherited Information

In addition to the implications described above, when new information (a representation of a relation) is stored, the server component stores representations of what are called "inherited" relations. Inherited relations are deduced by combining the new relation and its implied relations with relations that are already stored in the server's persistent storage.

For example, suppose that the relation cheese is a dairy product has been previously stored by the server and that the new relation to be entered is Swiss cheese is a cheese. Swiss cheese inherits the is a dairy product relation from cheese so the server creates and stores the relation Swiss cheese is a dairy product.

As with implications, the server uses the slot insertion item's slot type to determine what implied relations will be created and stored. Table 4 shows the actions taken to store the inherited consequences of each of the different slot types.

TABLE 4

Server actions to store inherited relations.

| Type of New Slot | Server Actions |
|---|---|
| Instance is Instances are Instance of Transitive Commutative Pair | If the frame exists and has Type is slot, then the new slot and its value are also added to every frame that is linked through a value structure to the Type is slot. |
| Is a type of | Locate the frame linked to the value structure and add every Instance is slot with its values from that frame to the new frame. For each addition, also create and store all the implied relationships. |
| Type is | Locate the frame linked to the value structure and add to that frame every Instance is slot of the new frame with its values. For each addition, also create and store all the implied relationships. |
| Is an attribute of | Create an Instance is slot from the data item associated with then new frame and add it to every frame linked by a value structure to the Is an attribute of slot. For each addition, also create and store all the implied relationships. |

Circular References

Circular references are permitted in relations stored by the server. When the server is storing inherited is a type of and type is relations, it searches the tree formed by frames connected by these slot types to determine if the relationship to be inserted already exists. This simply prevents the server from looping forever as a consequence of requests to store two relations such as A is a B and B is an A.

Synonyms

Under certain circumstances, a user may need to repeatedly access the same frame. A "to-do list" frame is an example of a frame that might be frequently accessed. Frame synonyms provide a short-cut method of accessing a particular frame. A frame synonym is simply an alternative, usually short and easy-to-remember, name for a frame. When search text is entered that is recognized as a synonym, the actual frame name replaces the search text and an exact-match search is performed. The available or frequently used frame synonyms may be displayed in a drop-down list by the user interface for easy access. Multiple synonyms may be assigned to the same frame if desired. The use of synonyms can greatly facilitate access to frequently needed information.

Many implementations of frame synonyms are possible. The synonym list may be managed on the client, if client-specific synonyms are desired. In this case, the translation from synonym to frame name is performed by the client and the server is unaware of the existence of the synonym. Alternatively, synonyms may be placed in a so-called "synonyms are" type slot and managed by the server. In this case, the same synonyms can be made available to all users. Care must be taken in the server software not to perform synonym translation except on the initial search text provided from a client. When expanding a synonyms are slot, for example, the actual synonym should be displayed, not the name of the frame represented by the synonym.

Retrieving Information

The server provides two basic mechanisms to send information to a client: returning search results and responding to requests for frame or slot expansions.

Searches

In the present invention, the user (including accessing software) need not have knowledge of or have access to the structure of the stored data in order to begin a search. In contrast, with a relational database, the user or accessing software must know or discover what tables exist and what the names of the columns of interest in each table are before a query can be formulated. Queries not referencing the database structure correctly are rejected by the relational database system. No such prior knowledge of the content or structure of data space to be searched is required in the present invention.

Once a search returns an element from the database in the present invention, the user (including accessing software) is able to use the returned element as the starting point for further examination of the data space by following (browsing) the connecting relationships in the frame system between the returned element and related elements resident in the database. Again, this exploration is allowed without prior knowledge of what relationships may exist. By contrast, to perform further explorations after an initial query in a prior art relational database requires the formulation of yet another query, requiring the same degree of foreknowledge of the relational structure as did the first.

The server component of the present invention performs the search of the data items that have been stored in persistent storage. To initiate a search, the client sends a search command to the server with a specification of the search type and a data item that describes the search target.

Searches are performed by comparing the supplied target data item with items retrieved from the server's persistent storage. In the preferred embodiment, the server can perform the following types of comparisons between the retrieved data items and the target data item:

1. Find items that exactly match the target item.
2. Find items that match the target item for the length of the target item. Given a target item of ab, this type of search would return all the data items beginning with the character string "ab"—such as able, abcess, and abercrombie.
3. Find items that include the target item. Given a target item of ab, this type of search would return all the data items in which the character string "ab" appears—such as able, dabble, and crab.
4. Find items that match a target item that is defined using "wildcards." If a wildcard "*" is defined such that * matches any length string of any characters, then a search for a target data item ab*c would return items such as abercrombie, but not able.

The server returns the set of frame structures associated with the matching data items in response to a search request.

Different search procedures are employed for included targets than for the other three target types.

The search for a target item that is included in another item is carried out as follows:

Step 1. Starting with the root node of the AVL tree, descend the right sub-tree by retrieving right sub-tree nodes until the bottom of the tree is reached. This bottom node becomes the "current node." Note that in some implementations, this step may be replaced by simply having stored the handle of the bottom right node. The purpose of this step is to get the handle of the node at one end of the thread that runs through the threaded AVL tree. The other end of the thread could be found by descending from the tree root through left sub-trees. Since the procedure to find included items is to follow the thread from one end to the other, it can begin from either end of the thread.

Step 2. Retrieve the data item associated with the current node. Using the data item IsEmbeddedMatch function, test if the target data item is included in the retrieved data item. If the target data item is included, retrieve the frame whose handle is designated by the current node m_frameID. The retrieved frame item and data item are used to construct a message that is sent to the client component that requested the search.

A new AVL node is then retrieved, whose handle is designated by the current node's m_MextNodeID value. This node becomes the current node and this step is repeated until the current node's m_NextNodeID is NONE.

In some embodiments, the client requesting the search will designate the handle of the AVL tree node where the search is to begin. In those cases, Step 1 of the procedure above is eliminated. Also in some embodiments, the client's search request specifies a limit on the number of data items or on the data volume that the search is to return. In these cases, the server maintains a running count of the number of data items or of the data volume and terminates the search when the client's limit is reached. The client can resume the search with another request that specifies the starting node handle for the search.

The search for a target item that is not included in another item is carried out as follows:

Step 1. Beginning with the root node of the AVL tree, follow the procedure described in the previous Inserting Data section. In that procedure, AVL nodes are retrieved and the data item Compare function is used to compare the retrieved item with the target item. The return value of the Compare function is used to determine which sub-tree to descend for the next AVL node retrieval. If no matching nodes are found in the tree, the search is terminated.

Step 2. The first matching node found is designated as the current node. If a matching node is found, it may not be the only one in the tree. To return the matching data items to the client in the tree sort-order, the AVL thread is followed from the current node by retrieving the node whose handle is given by the current node's m_LastNodeID. The data item Compare function is used to test if the retrieved node matches the target data item. If it does, the retrieved node becomes the current node. This step is repeated until the retrieved node does not match the target.

Step 3. Now, similar to step 2 of the included search procedure described above, the search follows the thread back from the current node, testing retrieved data items and sending matching data items with their handles back to the client. This is done by retrieving the data item associated with the current node. The data item Compare function is used to test if the retrieved data item satisfies the match criteria with the target data item. If there is a match, the frame having the handle designated by the current node's m_frameID retrieved and the frame item and data item are used to construct a message that is sent to the client component that requested the search. A new AVL node is then retrieved, whose handle is designated by the current node's m_NextNodeID value. This node becomes the current node and this step is repeated until the current node's m_NextNodeID is NONE or until the target data item and match criteria are such that no matching node can exist following the retrieved node in the AVL tree sort order.

Once search results are reported, further exploration of the stored data items is conducted by browsing the frame structure to locate related data items. Thus, the frame structure is used to easily store data, the data is searched independent of the frame structure to locate target data and the frame structure is again used to locate data related to the target data.

Frame Expansion

Clients can request that the server send them information describing the slots of a frame. In response to such a request, the server retrieves the frame structure for the designated frame from persistent storage. Slots are then retrieved from persistent storage, starting with the slot with handle given by the frame's m_slotFirst value. If the slot is a type that has an associated data item, the AVL node associated with this slot, designated by the slot's m_SymbolTreeID parameter, is retrieved. Then the slot's data item is retrieved, as described previously, starting with the symbol block designated by the AVL node's m_SymID parameter. The slot information and data item are then used to construct a message describing the slot that is sent to the client component.

After the first slot is retrieved and the message dispatched to the client, the next slot handle is given by the m_slotNext parameter of the current slot. This new slot is retrieved and the associated data item, if any, is again retrieved to construct another slot description message that is dispatched to the client. This is repeated until descriptions of all of the frame's slots have been dispatched to the requesting client. As with searches, in some implementations, the client's request may include a starting slot handle or limitations on the number of items or the data volume that can be returned.

Slot Expansion

Clients can also request that the server send them information describing the values of a slot. This request is satisfied with a procedure that is very similar to that used for sending the slots of a frame. In response to the request, the server retrieves the structure for the designated slot from persistent storage. Values are then retrieved from persistent storage, starting with the value with handle given by the slot's m_valueFirst parameter. To retrieve the data item associated with the value, the frame with handle given by the value's m_frameID parameter is retrieved. The AVL node associated with that frame, designated by the frame's m_SymbolTreeID parameter, is retrieved. Then, the frame's data item is retrieved, as described previously, starting with the symbol block designated by the AVL node's m_SymID parameter. The value structure information and data item are then used to construct a message describing the value that is sent to the client component.

After the first value is retrieved and the message dispatched to the client, the next value's handle is given by the m_valueNext parameter of the current value structure. This value structure is retrieved and the associated data item is retrieved to construct another value description message that is dispatched to the client. This process is repeated until descriptions of all of the slot's values have been dispatched to the requesting client. As with frame expansions and searches, in some implementations, the client's request may include a starting value handle or limit for the number of items or the data volume that can be returned.

Deleting Information

Items are deleted from persistent storage by sending a deletion request to the server. The deletion request specifies the type of object to be deleted—frame, slot, or value—and includes the handle of the item to be deleted. If the server component enforces inheritance consistency requirements on deletions, then the server first determines if the requested deletion operation violates those requirements.

Inheritance Inconsistence

The server's inheritance consistency checks are intended to prevent storage of inconsistent relations that would be undesirable in some applications.

An inheritance inconsistency can be created, for example, by inserting the two relations cheese is a dairy product and cheddar cheese is a cheese and then deleting the inherited relation, cheddar cheese is a dairy product, which the server will have created. The inheritance inconsistency is that the group cheese has property is a dairy product that a member of the group cheddar cheese does not share. Such an inconsistency may, of course, have no consequences for some applications. Depending on the application's requirements, the server can either proceed with the deletion or reject the request and send the client an error message. Again, depending on the application's requirements, the client component can respond to the rejected deletion request by:
1. Sending the server a deletion request with the additional instruction to ignore the consistency checks.
2. Deleting either the relation cheddar cheese is a cheese or the relation cheese is a dairy product to eliminate the inconsistency.

If the inheritance consistency requirements for the application have been satisfied, the deletion procedure can go forward according to the implication consistency requirements of the application.

Deletion Implication Consistency

In general, the goal of maintaining consistent implications when deleting items is to leave the set of stored relations such that the relations remaining after the deletion could have been created from nothing by some combination of additions alone. This is more desirable in some applications than others and the server component program can easily be modified to perform different implication deletions than those discussed here—or to do no implication deletions at all.

An example where items can be deleted to maintain consistent implications starts with the stored relation (information) Jack's age is 40. As described above, when this relation is stored, four other relations are also stored:

40 is the age of Jack
Jack's attributes include age
40 is an age
Age entries include 40.

Simply removing the value for 40 from the slot for age in the frame Jack would leave the following set of relations stored:

Jack's age is unknown
40 is the age of Jack
Jack's attributes include age
40 is an age
age entries include 40.

Obviously, 40 is not the age of Jack if Jack's age is unknown. A better result would be also to delete the second, fourth, and fifth relations to leave the set:

Jack's age is unknown
Jack has an age

This set of relations could have resulted from storing the relation Jack's age is unknown in an empty database.

The deletions the server makes to maintain consistent implications depend on the object—frame, slot, or value—being deleted and on the slot type of the relation that is the primary target of the deletion.

Table 5 shows the actions taken by the server in response to a request for the deletion of a value in a relation. The set of additional deletions is determined by the type of the slot in the target relation from which a value is being deleted. The numbers 1, 2, and 3 in Table 5 correspond to the frame data item, the slot data item (if any) and the value data item of the target relation. For each target slot type, Table 5 indicates that the value item in the target relation is to be deleted by showing a line through the number of the value data item (e.g.: 3). The implications of each target relation are also shown in Table 5, with lines through the numbers of the data items associated with frame, slot, or value structures that are to be deleted.

Some of the deletion rules shown Table 5 leave slots as placeholders or mnemonics, so that a client user can more easily fill in the empty values at a future time. This choice is convenient for some applications and can be modified as convenient for a particular program application.

While empty slots are maintained by the server, in a typical implementation of the server, frames without slots are deleted, along with the associated AVL node and data item, because they have no relationships with other data items.

TABLE 5

Server actions to service a request to delete a value.

| Target Relation Slot Type | Frame Data Item | Implication Relation Slot Type | Slot Data Item | Value Data Item |
|---|---|---|---|---|
| Instance is Instances are | 1 | Instance is Instances are | 2 | ~~3~~ |
|  | 3 | Instance of | ~~2~~ | ~~1~~ |
|  | 2 | Type is | None | ~~3~~ |
|  | 3 | Is a type of Delete this slot if it is empty. | None | ~~2~~ |
|  | 2 | Is an attribute of | None | 1 |
| Instance of | 1 | Instance of | 2 | ~~3~~ |
|  | 3 | Instance is | 2 | ~~1~~ |
|  | 2 | Type is | None | 1 |
|  | 1 | Is a type of | None | 2 |
|  | 2 | Is an attribute of | None | 3 |
| Commutative | 1 | Commutative | 2 | ~~3~~ |
|  | 3 | Commutative | 2 | ~~1~~ |

TABLE 5-continued

Server actions to service a request to delete a value.

| Target Relation Slot Type | Frame Data Item | Implication Relation Slot Type | Slot Data Item | Value Data Item |
|---|---|---|---|---|
|  | 2 | Type is | None | ~~3~~ |
|  | 3 | Is a type of Delete this slot if it is empty. | None | 2 |
|  | 2 | Is an attribute of Delete this slot if it is empty. | None | ~~1~~ |
|  | 2 | Is an attribute of Delete this slot if it is empty. | None | ~~3~~ |
| Pair | 1 | Pair | 2 | ~~3~~ |
|  | 3 | Pair | 4 | ~~1~~ |
|  | 2 | Type is | None | ~~3~~ |
|  | 4 | Type is | None | ~~1~~ |
|  | 4 | Is an attribute of | None | ~~3~~ |
|  | 3 | Is a type of | None | ~~2~~ |
|  | 2 | Is an attribute of | None | 1 |
| Transitive | 1 | Transitive | 2 | 3 |
|  | 3 | Transitive | 4 | 1 |
|  | 2 | Type is | None | 3 |
|  | 4 | Type is | None | ~~1~~ |
|  | 4 | Is an attribute of | None | ~~3~~ |
|  | 3 | Is a type of | None | 2 |
|  | 2 | Is an attribute of | None | 1 |
| Type is | 1 | Type is | None | ~~3~~ |
|  | 3 | Is a type of Delete this slot if it is empty. | None | ~~1~~ |
| Is a type of | 1 | Is a type of | None | ~~3~~ |
|  | 3 | Type is | None | ~~1~~ |
| Is an attribute of | 1 | Is an attribute of | None | ~~3~~ |
|  | 3 | Instance is | ~~1~~ | None |

Table 6 shows the actions taken by the server in response to a request for the deletion of a slot in a relation. The set of additional deletions is determined by the type of the slot in the target relation from which a slot is being deleted. The numbers 1, 2, and 3 in Table 6 correspond to the frame data item, the slot data item (if any) and the value data item of the target relation. For each target slot type, Table 6 indicates the items to be deleted by showing a lone through the number of the associated data item or through the slot type name.

TABLE 6

Server actions to service a request to delete a slot.

| Target Relation Slot Type | Frame Data Item | Implication Relation Slot Type | Slot Data Item | Value Data Item |
|---|---|---|---|---|
| Instance is Instances are | 1 | Instance is Instances are | ~~2~~ | 3 |
|  | 3 | Instance of | ~~2~~ | ~~1~~ |
|  | 2 | Type is | None | ~~3~~ |
|  | 3 | Is a type of | None | ~~2~~ |
|  | 2 | Is an attribute of | None | ~~1~~ |
| Instance of | 1 | Instance of | ~~2~~ | 3 |
|  | 3 | Instance is | ~~2~~ | ~~1~~ |
|  | 2 | Type is | None | ~~1~~ |
|  | 1 | Is a type of | None | ~~2~~ |
|  | 2 | Is an attribute | None | 3 |
|  |  | of |  |  |
| Commutative | 1 | Commutative | ~~2~~ | 3 |
|  | 3 | Commutative | ~~2~~ | ~~1~~ |
|  | 2 | Type is | None | ~~3~~ |
|  | 3 | Is a type of | None | ~~2~~ |
|  | 2 | Is an attribute | None | ~~1~~ |

TABLE 6-continued

Server actions to service a request to delete a slot.

| Target Relation Slot Type | Frame Data Item | Implication Relation Slot Type | Slot Data Item | Value Data Item |
|---|---|---|---|---|
| | 2 | Is an attribute of | None | ~~3~~ |
| Pair | 1 | Pair | ~~2~~ | ~~3~~ |
| | 3 | Pair | 4 | ~~1~~ |
| | 2 | Type is | None | ~~3~~ |
| | 4 | Type is | None | ~~1~~ |
| | 4 | Is an attribute of | None | ~~3~~ |
| | 3 | Is a type of | None | ~~2~~ |
| | 2 | Is an attribute of | None | 1 |
| Transitive | 1 | Transitive | ~~2~~ | ~~3~~ |
| | 3 | Transitive | 4 | ~~1~~ |
| | 2 | Type is | None | ~~3~~ |
| | 4 | Type is | None | ~~1~~ |
| | 4 | Is an attribute of | None | ~~3~~ |
| | 3 | Is a type of | None | ~~2~~ |
| | 2 | Is an attribute of | None | ~~1~~ |
| Type is | 1 | ~~Type is~~ | None | ~~3~~ |
| | 3 | Is a type of | None | ~~1~~ |
| Is a type of | 1 | ~~Is a type of~~ | None | ~~3~~ |
| | 3 | Type is | None | ~~1~~ |
| Is an attribute of | 1 | ~~Is an attribute of~~ | None | ~~3~~ |
| | 3 | Instance is | ~~1~~ | None |

If the server is requested to delete a frame, the procedure is to delete all of the values and their implications, as described in Table 5, and the all of the slots with their implications, as described in Table 6. Since the frame then has no slots, the frame, its AVL node and its data item are deleted.

Editing Information

The server satisfies edit requests by simply first executing the deletion procedure for the item being edited and then executing an insertion procedure to insert the new data item. The deletion procedure may be rejected for failing consistency checks, discussed in the description of data deletion above, if these are implemented.

Client Communication

The server component of the present invention can be used in a network environment serving multiple clients executing on different nodes in the network. In such an environment, the server can act as a "subscription server," maintaining a description of items that have been sent to the clients to service their requests and sending them update messages if any of the items that the clients have been sent change.

In this mode, several users can have their clients display a set of relations and any modification of those relations made by any user will be sent to all the clients for display. This way, the system of the present invention acts as a means for a group of users to share information.

The communication between the server and clients is typically implemented with network communication software. In the preferred embodiment, this communication is implemented between the client and server by using Microsoft DCOM software. An obvious alternative would be to use communication software based on the Object Management Group's CORBA software standard, or based on web service such as XML/SOAP. Other standard or non-standard software communication mechanisms can be used to provide communication between the server and its clients.

Multiple Execution Threads

The server is typically implemented as a computer program that has multiple execution threads. This permits the server to use one thread to receive client commands and a second thread to service them. The advantage of this approach is that it permits the clients to send a command to the server to terminate execution of a search or an expansion that is in progress. The server can receive the search termination command and interrupt the other thread executing it.

It is also often convenient to have the server create a separate thread to manage the delivery of information to each client. In a network environment, this decouples the clients from each other because the delivery thread for a fast client can proceed while the delivery thread for a slow client waits. In one embodiment, the client and server are both portions of a single program that executes on a machine running the MS-DOS operating system. In this implementation, the server component of the program periodically checks for keyboard input signaling it to terminate a search that is in progress.

Transactions

As mentioned previously, to ensure the integrity of the stored data, the server breaks up interactions with the persistent storage system into atomic transactions. The natural atomic unit for this is a client command. This means that either the storage consequences of a client command are completely stored in persistent storage, with all their effects on implied relations and inheritances, or no change is made to persistent storage.

Command Interface

A typical set of commands supported by the server is shown in Table 7.

TABLE 7

Typical server commands.

| Command | Description |
|---|---|
| Open | Open a database file in a file system or region in a persistent storage system that contains a set of stored data structures of the invention. A designator for the file or region to be opened must be supplied by the client. |
| Close | Close a database file in a file system or region in a persistent storage system that contains a set of stored data structures of the present invention. |
| Add | Insert a data item (with implications and inheritances) into the data in persistent storage. |
| Edit | Edit a data item in persistent storage. As mentioned previously, this is equivalent to a combination of Delete and Add. An item handle and a new data item must be provided by the client. |
| Delete | Delete an item (with its implications and inherited relations) from persistent storage. An item handle must be provided. |
| Expand | Send this client the slots from a parent frame or the values from a parent slot. An item handle for the parent must be provided by the client. This command also causes the |

TABLE 7-continued

Typical server commands.

| Command | Description |
|---|---|
| | server to send the client notification of any changes in the value or slot descriptions sent to the client. |
| Cancel Subscription | This command causes the server to stop sending the client notifications of changes in a frame, slot, or value item. |
| Stop Expansion | This command directs the server to stop servicing an Expand command from the client. |
| Search | This command directs the server to search for data items that match a certain criteria. The server sends descriptions of the matching frames to the client. After the search is concluded, the server will continue to send the client notification of changes in the frames returned as search results. The client can halt these notifications with a Cancel Subscription command. |
| Stop Search | This command directs the server to halt a search in progress that the client has requested. |
| Disconnect | In a multiple-client environment, this command informs the server that a client is disconnecting. The server stops sending item updates to the client. |

Compacting Persistent Storage

The server's storage system is used to store five different types of objects: symbol blocks, AVL tree nodes, frames, slots, and values. As mentioned previously, these structures can be stored in fixed length segments and unused storage region segments can be added to a linked list of free segments. It may become desirable, however, to reduce the total persistent storage region occupied by moving all of the free segments to one end, reassigning them for use in some other application. To accomplish this, data occupying segments in the region being released is moved to blocks taken from the linked list of free blocks.

The structure being moved from one storage segment to another has its handle value set to the value appropriate for the destination segment and then it can be copied to its new location. All the stored data structures that contain references to the old location must be updated as well. In addition, all of the operations to move a structure must be taken together as an atomic transaction to prevent corruption of the stored data in the event of a power, or some other, failure.

Table 8 lists by data structure type the method to locate all the references to a data structure that is being moved.

TABLE 8

Procedures to locate references to stored data structures.

| Data Structure | Procedure to Locate All Stored References |
|---|---|
| Symbol Block | Every symbol block has a reference to the first node used to store its data item. By following the linked list from the first node, a block's predecessor in the linked list of the data item's blocks can be found. The first block is referenced by the other blocks for the data item. As stated above, these can be found by following the linked list of symbol blocks. A first block is also referenced by the AVL tree node whose handle is given by the block's m_SymbolTreeId parameter. |
| AVL Tree Node | An AVL tree node is referenced by a frame structure, a symbol block, possibly a number of slot structures, and by two other AVL tree nodes. The frame structure has the handle given by the node's m_frameID parameter. The symbol block has the handle given by the node's m_SymID parameter. The node is referenced by its neighbors on the AVL tree thread, whose handles are given by the node's m_NextNodeID and m_lastNodeID parameters. The node is referenced as a sub-tree by its AVL tree parent, which will be one of these two thread neighbors. Any slots associated with the node's data item will contain references to the node. The parent frames of these slots will referenced by the value structures of the is an attribute of slot of the frame with handle given by the node's m_frameID parameter. |
| Frame | A frame structure is referenced by the AVL tree node whose handle is given by the frame's m_SymbolTreeId parameter. A frame is also referenced by value structures. As a consequence of inserting relations as a set with their implications, these values are the children of slots whose parent frames are referenced by values that are the children of slots of this frame. |
| Slot | Slots are referenced by their parent frame, whose handle is given by the slot's m_parentFrameID parameter. Slots may also by referenced by a previous sibling slot of the parent frame. This previous sibling can be located by following the slot linked list from the first slot referenced by the parent frame's m_slotFirst parameter. Slots are also referenced by their nearest neighbors on the linked list of all slots. These neighbors' handles are given by the slot's m_slotFlink and m_slotBlink parameters. |
| Value | Values are referenced by their parent slot, whose handle is given by the slot's m_parentSlotID parameter. Values may also by referenced by a previous sibling value of the parent slot. This previous sibling can be located by following the value linked list from the first value referenced by the parent slot's m_valueFirst parameter. |

Client Description

The number of possible user interfaces that can provide access to data that is maintained in a database of the present invention is virtually unlimited. Application-specific interfaces can be created for particular domains that reflect the peculiarities of that domain. A general-purpose interface has been constructed that provides access to the basic functions and reflects the unique structure of the database.

The general-purpose interface allows the user to enter search text to be found in the database. The search may be specified as one of three types:
  Search for items that begin with <search text>
  Search for items that include <search text>
  Search for items that exactly match <search text>

Other search types are possible. These are simply presented to demonstrate the capability of supporting alternative matching criteria.

Matching items are displayed in a column at the left edge of the client area of the application window. The user may elect to expand one of the items to reveal its slots.

The general-purpose interface presents the information retrieved in a multi-line indented format. A sample display image of this interface is shown in FIG. 9. In this format, the frame is presented on the first line, with slots listed below and indented one level. Here is an example:

```
Iomega
    Is a
    Products are
    Address is
    Phone number is
```

If values are shown, they are listed below the slot with which they are associated and indented two levels. Here is an example:

```
Iomega
    Is a
    Products are
        Jaz drive
        Zip drive
        Jaz cartridges
        Zip cartridges
    Address is
    Phone number is
```

In the above example, the "Products are" slot is said to have been expanded.

Values can be expanded to reveal the slots of the frame to which they refer. For example:

```
Iomega
    Is a
    Products are
        Jaz drive
            Price is
            Availability is
        Zip drive
        Jaz cartridges
        Zip cartridges
    Address is
    Phone number is
```

These slots can in turn be expanded to reveal their values. This process can continue indefinitely, allowing the user to browse through the available information. Facilities are provided to allow the user to:

Enter new facts into the database
Delete values, slots, or entire frames from the database
Modify the text of a frame, slot, or value
Expand and contract items displayed
Select an item to become the new "root" item. (The root item is the leftmost item displayed.)
Scroll to view information which is off-screen
Abort retrieval if the number of items retrieved is too large
Export data in a format which can be later restored
Import data from other formats generated by other tools such as spreadsheets and relational databases
Export data in a format which can be read by other tools such as spreadsheets The user interface client program may subscribe or "express interest in" information maintained by the server. The server then publishes (sends) updates to clients who have expressed interest in an item that has been changed. This allows the client to display changes to items of interest in real time as they are modified by other clients. Clients may of course, also express a loss of interest for an item in which they were previously interested.

A unique feature of the present invention is that the action of addition, removal, and modification of slots assigned to a frame is published by the server to clients who have expressed interest in the frame. This would be analogous to a relational database informing its users in real time that a column has been added to a table. In addition, the structure of the data items allows clients to be constructed that can automatically accommodate the change.

The publish-and-subscribe capability of the system, combined with the robust capabilities for accommodating change enabled by the structure of the information, makes "groupware" applications that allow sharing of information in real time relatively easy to design and construct.

The client and the server identify information items (i.e., frames, slots, and values) using handles. The handle value is assigned by the server and is guaranteed to refer only to the designated data item.

When a client adds a new item to the database, the client sends an insertion request to the server containing a temporary handle associated with the new data item. The server responds with a message containing the temporary handle and the server-assigned handle to replace the temporary handle. Thereafter, all communication between the client and the server uses the server-supplied handle. Of course, various changes, modifications and alterations in the teachings of the present invention may be contemplated by those skilled in the art without departing from the intended spirit and scope thereof. As such, it is intended that the present invention only be limited by the terms of the appended claims.

What is claimed is:

1. A user-based computer system including a persistent memory that functions as both an information storage and retrieval system and into which persistent memory primary information can be entered, wherein primary information is information from outside the persistent memory, comprising data items and connecting relationships among such data items, comprising:

a computer-readable medium storing a server computer program that, when executed by a computer;
implements a frame system within the persistent memory; which frame system includes frames, slots and values into which primary information can be entered and stored;
derives, when primary information is entered into the frame system, automatically and without additional primary information, new information in the form of new frames with associated slots and values which is different than the frames with associated slots and values of the primary information and which new information comprises information not derived from inheritance relationships between the primary information and information already present in the frame system; and
stores such new information within the frame system.

2. The system of claim 1 wherein said persistent memory stores information outside said frame system and said server computer program, when executed by a computer, searches and retrieves information in the persistent memory from outside the frame system.

3. The system of claim 2 wherein said server computer program, when executed by a computer, browses the information in the persistent memory by following connecting relationships between data items in the frame system.

4. The system of claim 3 wherein every data item has at least one connecting relationship to at least one other data item.

5. The system of claim 1 wherein said server computer program, when executed by a computer, browses the information in the persistent memory by following connecting relationships between data items in the frame system.

6. The system of claim 5 wherein every data item has at least one connecting relationship to at least one other data item.

7. The system of claim 1, further comprising:

a computer-readable medium storing a client computer program that, when executed by a computer, provides a user interface for entering information from outside the persistent memory into the persistent memory where it is managed by said server program and for receiving information from the persistent memory and making it available to a user.

8. The system of claim 7 wherein:

said server computer program, when executed by a computer, searches and retrieves information in the persistent memory from other than the frame system; and said client computer program, when executed by a computer, provides a user interface from which commands can be directed to said server program to search in and retrieve information from the persistent memory.

9. The system of claim 8 wherein:

said server computer program, when executed by a computer, browses the information in the persistent memory by following connecting relationships between data items in the frame system; and said client computer program, when executed by a computer, further provides a user interface from which the server computer program can be caused to browse the information in the persistent memory.

10. The system of claim 9 wherein every data item has at least one connecting relationship to at least one other data item.

11. The system of claim 7 wherein;

said server computer program, when executed by a computer, browses the information in the persistent memory by following connecting relationships between data items in the frame system; and said client computer program, when executed by a computer, provides a user interface from which commands can be directed to said server program to browse information in the persistent memory.

12. The system of claim 11 wherein every data item has at least one connecting relationship to at least one other data item.

13. The system of claim 1 wherein the derived information in the form of other connecting relations is derived from primary information and other data items stored in the persistent memory.

14. A method of storing for later retrieval information comprising data items and connecting relationships among such data items in a computer's persistent memory wherein primary information is information from outside the persistent memory comprising data items and connecting relationships among such data items, comprising:

(a) storing primary information in a frame system in the persistent memory wherein said frame system contains frames, slots, and values;

(b) when performing step (a), deriving new information, automatically and without additional primary information, in the form of new frames and associated slots and values which are different from those frames, and associated slots, and values present in the primary information and which comprise information not derived from inheritance relationships between the primary information and information already present in the frame system; and (c) storing said new frames and associated slots and values from step (b) in the frame system of the persistent memory for later retrieval.

15. In the method of claim 14, wherein information including frame locations is stored in the persistent memory outside of the frame system, the further step comprising:

(d) searching the persistent memory outside of the frame system for locations of frames in the frame system.

16. In the method of claim 15, after step (d), the further step comprising:

(e) browsing the information in the persistent memory by following connecting relationships between data items in the frame system starting at a frame located by step (d).

17. In the method of claim 14, after step (c), the steps further comprising:

(d) browsing the information in the persistent memory by following connecting relationships between data items in the frame system.

18. In the method of claim 17, wherein step (b) is computer driven.

19. In the method of claim 14, the steps further comprising:

(d) when performing step (a), deriving additional information in the form of connecting relationships between data items from the primary information and additional information previously stored in the persistent memory; and (e) storing the additional information derived in step (d) in the frame system of the persistent memory for later retrieval.

20. In the method of claim 19, after step (e), the step further comprising:

(f) searching outside of the frame system for information in the persistent memory.

21. In the method of claim 20, after step (f), the step further comprising:

(g) browsing the information in the persistent memory by following connecting relationships between data items in the frame system.

22. In the method of claim 21 wherein step (g) is initiated at a location within the frame system based on information located by step (f).

23. In the method of claim 22, wherein step (b) is computer driven.

24. In the method of claim 23, wherein step (d) is computer driven.

25. In the method of claim 19, the step further comprising:

(f) storing data items in the persistent memory outside of the frame system to be retrieved later and used independently of the frame system to locate related items stored in the frame system.

26. In the method of claim 25, the step further comprising:

(g) searching the data items stored by step (f).

27. In the method of claim 26, the step further comprising:

(h) browsing the information in the persistent memory by following connecting relationships between data items in the frame system.

28. In the method of claim 27 wherein step (h) is initiated at a location within the frame system based on the data items located by step (g).

29. In the method of claim 28, wherein step (b) is computer driven.

30. In the method of claim 19, the step further comprising:

(f) browsing the information in the persistent memory by following connecting relationships between data items in the frame system.

31. In the method of claim 30, wherein step (b) is computer driven.

32. In the method of claim 31, wherein step (d) is computer driven.

33. In the method of claim 14, the step further comprising:
(d) storing data items in the persistent memory outside of the frame system to be retrieved later and used independently of the frame system to locate related items stored in the frame system.

34. In the method of claim 33, the step further comprising:
(e) searching the data items stored by step (d).

35. In the method of claim 34, the step further comprising:
(f) browsing the information in the persistent memory by following connecting relationships between data items in the frame system.

36. In the method of claim 35 wherein step (f) is initiated at a location within the frame system based on the data items located by step (e).

37. In the method of claim 36, wherein step (b) is computer driven.

* * * * *

UNITED STATES PATENT AND TRADEMARK OFFICE
CERTIFICATE OF CORRECTION

PATENT NO.       : 7,356,540 B2
APPLICATION NO.  : 10/189754
DATED            : April 8, 2008
INVENTOR(S)      : David E. A. Smith and Anton R. Fleig It is certified that error appears in the above-identified patent and that said Letters Patent is hereby corrected as shown below:

Col. 9, Line 8: Add the lines as follows: "Member Functions
IWSymbol(void * data = NULL, int dsize = 0);
virtual ~IWSymbol();"

Col. 9, Line 9: Correct "for the s" to read: "for the struct tagSymbolBlock"

Signed and Sealed this

Twenty-fourth Day of February, 2009

JOHN DOLL
*Acting Director of the United States Patent and Trademark Office*